United States Patent
Hosoya et al.

(10) Patent No.: US 10,247,830 B2
(45) Date of Patent: Apr. 2, 2019

(54) VEHICLE POSITION DETERMINATION DEVICE, VEHICLE CONTROL SYSTEM, VEHICLE POSITION DETERMINATION METHOD, AND VEHICLE POSITION DETERMINATION PROGRAM PRODUCT

(71) Applicant: Honda Motor Co., Ltd., Tokyo (JP)

(72) Inventors: Tomoyuki Hosoya, Saitama (JP); Yoshihiro Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/587,414

(22) Filed: May 5, 2017

(65) Prior Publication Data
US 2017/0336515 A1 Nov. 23, 2017

(30) Foreign Application Priority Data
May 23, 2016 (JP) ................................. 2016-102430

(51) Int. Cl.
| | |
|---|---|
| G01S 19/40 | (2010.01) |
| G01C 21/28 | (2006.01) |
| G01S 19/49 | (2010.01) |
| G01C 21/32 | (2006.01) |
| G06K 9/00 | (2006.01) |

(52) U.S. Cl.
CPC .............. *G01S 19/40* (2013.01); *G01C 21/28* (2013.01); *G01C 21/32* (2013.01); *G01S 19/49* (2013.01); *G06K 9/00798* (2013.01)

(58) Field of Classification Search
CPC combination set(s) only.
See application file for complete search history.

(56) References Cited

U.S. PATENT DOCUMENTS

2011/0054716 A1* 3/2011 Stahlin ................... G01C 21/28
701/1

FOREIGN PATENT DOCUMENTS

| JP | 2008-249639 | 10/2008 |
|---|---|---|
| JP | 2009-121845 | 6/2009 |
| JP | 2015069287 A * | 4/2015 |

OTHER PUBLICATIONS

JP2015069287—English translation 2015 (Year: 2015).*
"Office Action of Japan Counterpart Application" dated Mar. 13, 2018, with English translation thereof, p. 1-p. 10.

* cited by examiner

*Primary Examiner* — Anne M Antonucci
*Assistant Examiner* — Renee LaRose
(74) *Attorney, Agent, or Firm* — JCIPRNET

(57) ABSTRACT

An object is to provide a vehicle position determination device, a vehicle control system, a vehicle position determination method, and a vehicle position determination program capable of determining a position of a vehicle with higher accuracy. A vehicle position determination device includes a coordinates acquisition unit that acquires a position of a vehicle in a geographic coordinate system, a recognition unit that acquires lane information of a road on which the vehicle travels and recognizes the position of the vehicle on the lane, and a control unit that corrects the position acquired by the coordinates acquisition unit on the basis of the position recognized by the recognition unit, and determines the position of the vehicle in the geographic coordinate system.

16 Claims, 14 Drawing Sheets

| GNSS position measurement error | output adjustment gain for GNSS | | | output adjustment gain for camera | |
|---|---|---|---|---|---|
| | $K_1$ | $K_2$ | $K_4$ | $K_3$ | $K_5$ |
| smaller than threshold value th (high accuracy) | high | high | high | low | low |
| equal to or greater than threshold value TH (low accuracy) | low | low | low | high | high |

VEHICLE POSITION DETERMINATION DEVICE, VEHICLE CONTROL SYSTEM, VEHICLE POSITION DETERMINATION METHOD, AND VEHICLE POSITION DETERMINATION PROGRAM PRODUCT

CROSS-REFERENCE TO RELATED APPLICATION

This application claims the priority benefit of Japan application serial no. 2016-102430, filed on May 23, 2016. The entirety of the above-mentioned patent application is hereby incorporated by reference herein and made a part of this specification.

BACKGROUND OF THE INVENTION

Field of the Invention

The present invention relates to a vehicle position determination device, a vehicle control system, a vehicle position determination method, and a vehicle position determination program product.

Description of Related Art

In the related art, a technology for allowing a position of a vehicle to be recognized with a position measurement system using satellites such as a global positioning system (GPS), imaging white lines on a road being traveled on, and recognizing a relative position of the vehicle relative to dividing lines of the road being traveled on the basis of a captured image is known (for example, see Japanese Unexamined Patent Application Publication No. 2009-121845). For example, in the related art, when a vehicle passes through a section in which position recognition is difficult, the sensitivity of either the position measurement system or image processing may be changed.

SUMMARY OF THE INVENTION

However, according to the related art, a position of a vehicle may not be able to be accurately determined in some cases.

The present invention has been made in view of such circumstances, and an object of the present invention is to provide a vehicle position determination device, a vehicle control system, a vehicle position determination method, and a vehicle position determination program capable of determining a position of a vehicle with higher accuracy.

A first aspect of the present invention of is a vehicle position determination device, including: a coordinates acquisition unit that acquires a position of a vehicle in a geographic coordinate system; a recognition unit that acquires lane information of a road on which the vehicle is traveling and recognizes the position of the vehicle in the lane; and a control unit that corrects the position acquired by the coordinates acquisition unit on the basis of the position recognized by the recognition unit, and determines the position of the vehicle in the geographic coordinate system.

According to a second aspect of the present invention, in the vehicle position determination device according to the first aspect, the coordinates acquisition unit acquires the position of the vehicle determined in the geographic coordinate system on the basis of information acquired from radio waves coming from a satellite, and the control unit derives a required correction amount on the basis of a comparison of the position acquired by the coordinates acquisition unit with the position recognized by the recognition unit, and corrects the position acquired by the coordinates acquisition unit on the basis of the derived required correction amount to determine the position of the vehicle in the geographic coordinate system.

According to a third aspect of the present invention, in the vehicle position determination device according to the second aspect, the recognition unit recognizes a dividing line of a road included in an image obtained by imaging the road on which the vehicle travels, and recognizes a relative position of the vehicle relative to the recognized division line, the control unit derives a first deviation between a reference position on the road of which the division line is recognized by the recognition unit and the position acquired by the coordinates acquisition unit, and a second deviation between the reference position and the position recognized by the recognition unit, and derives the required correction amount on the basis of a difference between the first deviation and the second deviation that are derived.

According to a fourth aspect of the present invention, in the vehicle position determination device according to the third aspect, the reference position is a lane center, the first deviation is a distance from a lane center of the road of which the division line is recognized by the recognition unit to the position acquired by the coordinates acquisition unit, and the second deviation is a distance from the lane center of the road of which the division line is recognized by the recognition unit to the position recognized by the recognition unit.

According to a fifth aspect of the present invention, the vehicle position determination device according to the second aspect further includes a trajectory generation unit that generates a trajectory including a plurality of future target positions to be reached by the vehicle, the target positions being continuous in time series in a traveling direction of the vehicle from the position acquired by the coordinates acquisition unit, the control unit derives a first deviation between a predetermined target position among the target positions included in the trajectory generated by the trajectory generation unit and the position acquired by the coordinates acquisition unit, and a second deviation between the predetermined target position and the position recognized by the recognition unit, and derives the required correction amount on the basis of a difference between the first deviation and the second deviation.

According to a sixth aspect of the present invention, in the vehicle position determination device according to the fifth aspect, the first deviation is a distance that is a sum of a distance from the lane center of the road of which the division line is recognized by the recognition unit to the predetermined target position and a distance from the lane center of the road of which the division line is recognized by the recognition unit to the position acquired by the coordinates acquisition unit, and the second deviation is a distance from the predetermined target position to the position recognized by the recognition unit.

According to a seventh aspect of the present invention, in the vehicle position determination device according to any one of the second to sixth aspects, the control unit derives a movement amount required when the vehicle travels for a predetermined time or a predetermined distance from the position acquired by the coordinates acquisition unit, as the required correction amount.

According to an eighth aspect of the present invention, in the vehicle position determination device according to the seventh aspect, the control unit repeatedly executes deriving a movement amount required when the vehicle travels for a predetermined time or a predetermined distance from the corrected position, as a required correction amount, and then further correcting the corrected position with the derived movement amount.

According to a ninth aspect of the present invention, in the vehicle position determination device according to the seventh aspect or the eighth aspect, the movement amount includes some or all of a movement amount in a traveling direction of the vehicle, a movement amount in a vehicle width direction of the vehicle, and a rotational movement amount in a yaw angle direction of the vehicle.

According to a tenth aspect of the present invention, in the vehicle position determination device according to any one of the second to ninth aspects, the control unit weights one or both of the position acquired by the coordinates acquisition unit and the position recognized by the recognition unit to derive the required correction amount on the basis of an accuracy according to the determination of the position acquired by the coordinates acquisition unit.

According to an eleventh aspect of the present invention, in the vehicle position determination device according to the tenth aspect, when the accuracy is lower than a threshold value, the control unit causes a weight of the position acquired by the coordinates acquisition unit to be greater than a weight of the position recognized by the recognition unit.

According to a twelfth aspect of the present invention, in the vehicle position determination device according to the tenth aspect, when the accuracy is equal to or higher than a threshold value, the control unit causes a weight of the position acquired by the coordinates acquisition unit to be smaller than a weight of the position recognized by the recognition unit.

The invention according to a thirteenth aspect is a vehicle control system, including: a coordinates acquisition unit that acquires a position of a vehicle in a geographic coordinate system; a recognition unit that acquires lane information of a road on which the vehicle travels and recognizes the position of the vehicle on the lane; a trajectory generation unit that generates a trajectory including a plurality of future target positions to be reached by the vehicle, the target positions being continuous in time series in a traveling direction of the vehicle from the position acquired by the coordinates acquisition unit, an automated drive control unit that automatically performs at least one of speed control and steering control of the vehicle on the basis of the trajectory generated by the trajectory generation unit; and a control unit that corrects the position acquired by the coordinates acquisition unit on the basis of one or both of the position recognized by the recognition unit and a target position included in the trajectory generated by the trajectory generation unit, and determines the position of the vehicle in the geographic coordinate system.

The invention according to a fourteenth aspect is a vehicle position determination method, wherein a vehicle-mounted computer acquires a position of a vehicle in a geographic coordinate system, acquires lane information of a road on which the vehicle travels, recognizes the position of the vehicle on the lane, corrects the acquired position on the basis of the recognized position, and determines the position of the vehicle in the geographic coordinate system.

The invention according to a fifteenth aspect is a vehicle position determination program product comprising a computer usable medium having control logic stored therein for causing a vehicle-mounted computer to: acquire a position of a vehicle in a geographic coordinate system, acquire lane information of a road on which the vehicle travels, recognize the position of the vehicle on the lane, correct the acquired position on the basis of the recognized position, and determine the position of the vehicle in the geographic coordinate system.

According to the invention described in each aspect, it is possible to determine the position of the vehicle more accurately.

DETAILED DESCRIPTION OF THE INVENTION

Hereinafter, embodiments of a vehicle position determination device, a vehicle control system, a vehicle position determination method, and a vehicle position determination program according to the present invention will be described with reference to the drawings.

<Common Configuration>

Figure 1:
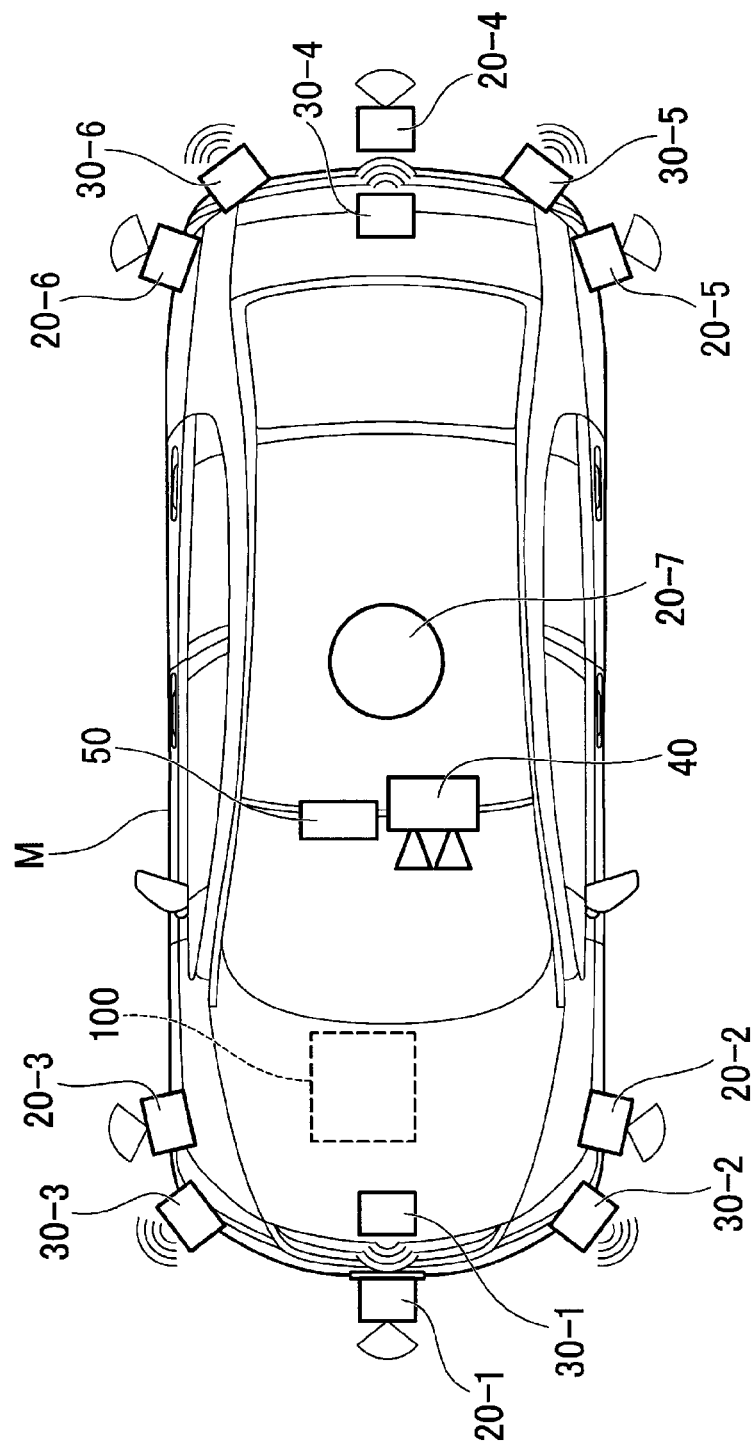
FIG. 1 is a diagram illustrating components of a host vehicle M on which a vehicle control system 100 according to each embodiment is mounted.

FIG. 1 is a diagram illustrating components of a vehicle on which a vehicle control system 100 of each embodiment is mounted (hereinafter referred to as a host vehicle M). The vehicle on which the vehicle control system 100 is mounted is, for example, a two-wheeled, three-wheeled, or four-wheeled car, and includes a car including an internal combustion engine such as a diesel engine or a gasoline engine as a power source, an electric car including an electric motor as a power source, a hybrid car including both of an internal combustion engine and an electric motor, or the like. The electric car, for example, is driven using electric power discharged by a battery, such as a secondary battery, a hydrogen fuel cell, a metal fuel cell, or an alcohol fuel cell.

As illustrated in FIG. 1, sensors such as finders 20-1 to 20-7, radars 30-1 to 30-6, and a camera 40, a navigation device 50 (a route guidance device), and the vehicle control system 100 are mounted on the host vehicle M.

The finders 20-1 to 20-7 are, for example, LIDARs (light detection and ranging or laser imaging detection and ranging) that measure scattered light with respect to irradiation light and measure a distance to a target. For example, the finder 20-1 is attached to a front grille or the like, and the finders 20-2 and 20-3 are attached to a side of a vehicle body, a side view mirror, the inside of a headlamp, the vicinity of a side lamp, or the like. The finder 20-4 is attached to a trunk lid or the like, and the finders 20-5 and 20-6 are attached to, for example, a side of a vehicle body or the inside of a tail light. The finders 20-1 to 20-6 described above have, for example, a detection region of about 150° with respect to a horizontal direction. Further, the finder 20-7 is attached to a roof or the like. The finder 20-7 has, for example, a detection region of 360° with respect to a horizontal direction.

The radars 30-1 and 30-4 are, for example, long-distance millimeter wave radars having a detection region in a depth direction wider than the other radars. Further, the radars 30-2, 30-3, 30-5, and 30-6 are intermediate-distance millimeter wave radars having a detection region in a depth direction narrower than the radars 30-1 and 30-4.

Hereinafter, when the finders 20-1 to 20-7 are not particularly distinguished, the finders 20-1 to 20-7 are simply described as "finders 20", and when the radars 30-1 to 30-6 are not particularly distinguished, the radars 30-1 to 30-6 are simply described as "radars 30." The radars 30 detect, for example, an object using a frequency modulated continuous wave (FM-CW) scheme.

The camera 40 is, for example, a digital camera using a solid-state imaging element such as a charge coupled device (CCD) or a complementary metal oxide semiconductor (CMOS). The camera 40 is attached to an upper portion of a front windshield, a back surface of an interior mirror, or the like. The camera 40 repeatedly images periodically, for example, in front of the host vehicle M. The camera 40 may be a stereo camera including a plurality of cameras.

The configuration illustrated in FIG. 1 is merely an example, and parts of the configuration may be omitted or other configurations may be added.

<First Embodiment>

Figure 2:
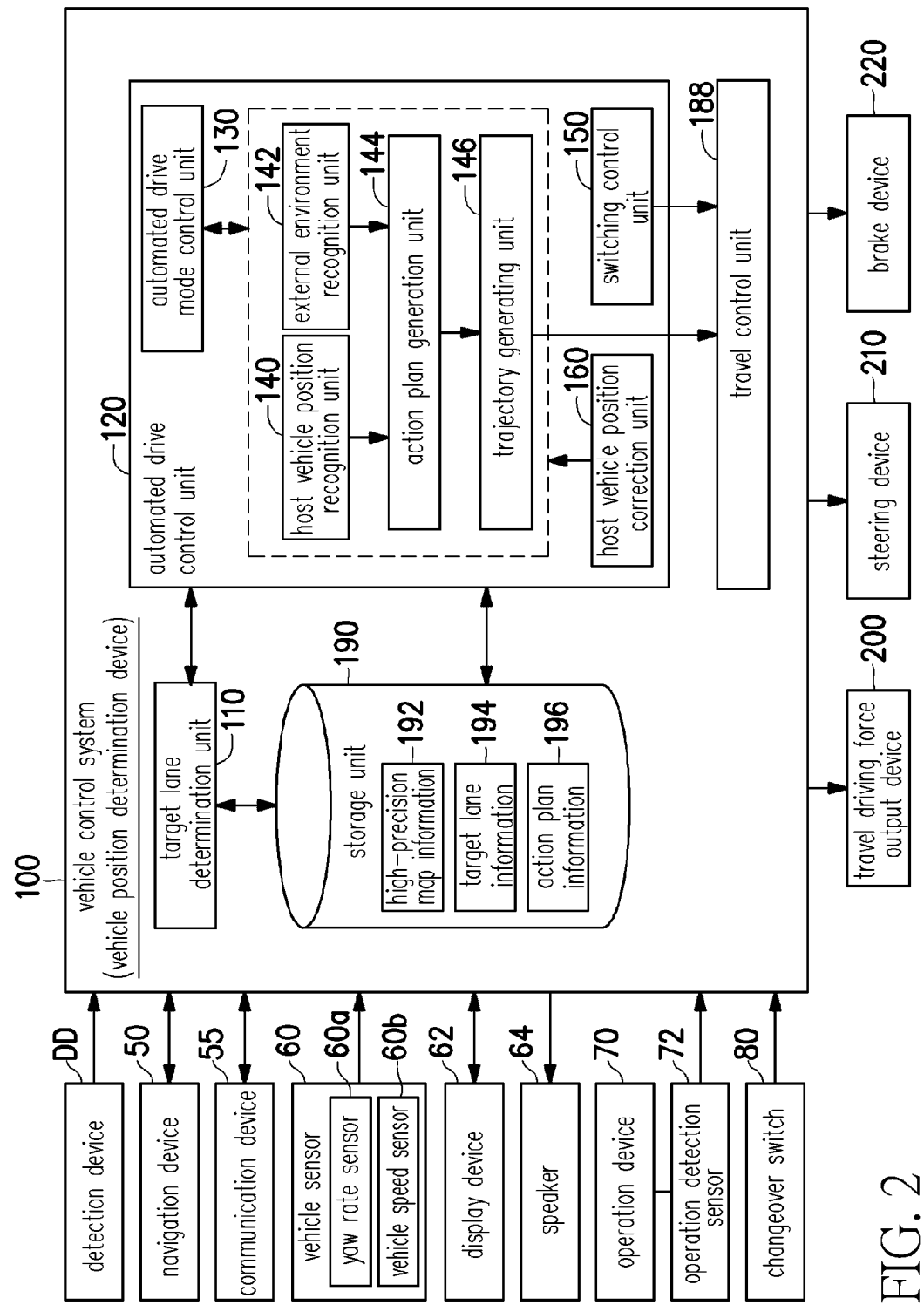
FIG. 2 is a functional configuration diagram focusing on the vehicle control system 100 according to a first embodiment.

FIG. 2 is a functional configuration diagram focusing on the vehicle control system 100 according to a first embodiment. A detection device DD including a finder 20, a radar 30, a camera 40, or the like, a navigation device 50, a communication device 55, a vehicle sensor 60, a display device 62, a speaker 64, an operation device 70, an operation detection sensor 72, a changeover switch 80, a vehicle control system 100, a travel driving force output device 200, a steering device 210, and a brake device 220 are mounted on a host vehicle M. These apparatuses or devices are connected to each other by a multiplex communication line such as a controller area network (CAN) communication line, a serial communication line, a wireless communication network, or the like. A vehicle control system in the claims does not indicate only the "vehicle control system 100" and may include a configuration (for example, the detection device DD) other than the vehicle control system 100.

The navigation device 50 includes, for example, a global navigation satellite system (GNSS) receiver or map information (navigation map), a touch panel display device functioning as a user interface, a speaker, and a microphone. The GNSS receiver, for example, receives radio waves that are transmitted from an artificial satellite for a GPS and determines its own position, that is, the position of the host vehicle M. The position of the host vehicle M determined by the GNSS receiver is represented as, for example, coordinates ($X_{act}$, $Y_{act}$) of a ground coordinate system $\Sigma_G$ in which a ground local plane is represented by X-Y. For example, X indicates latitude and Y indicates longitude, but the present invention is not limited thereto and these may be arbitrarily set. The ground coordinate system $\Sigma_G$ is an example of a "geographic coordinate system".

Further, the navigation device 50 specifies, for example, an angle $\theta_{act}$ (hereinafter referred to as a yaw angle $\theta_{act}$) indicating a posture of the host vehicle M with respect to an X-Y plane of the ground coordinate system $\Sigma_G$ from a relative positional relationship between antennas respectively included in a plurality of GNSS receivers. The navigation device 50 may correct coordinates $X_{act}$, $Y_{act}$ and the yaw angle $\theta_{act}$ by performing communication with, for example, a wireless base station of which position coordinates are obvious on the basis of a relative positioning scheme or may correct the coordinates $X_{act}$, $Y_{act}$ and the yaw angle $\theta_{act}$ using a phase difference of radio waves received by each of the plurality of GNSS receivers on the basis of an interferometric positioning scheme. Further, the navigation device 50 may specify or complement the coordinates $X_{act}$, $Y_{act}$ and the yaw angle $\theta_{act}$ by means of an Inertial Navigation System (INS) using an output of the vehicle sensor 60. The navigation device 50 is an example of a "coordinates acquisition unit".

The navigation device 50 derives a route from a determined position to a destination designated by a user. The route derived by the navigation device 50 is provided to a target lane determination unit 110 of the vehicle control system 100. Further, the navigation device 50 performs guidance through sound or navigation display with respect to the route to the destination when the vehicle control system 100 is executing a manual driving mode. A configuration for determining the position of the host vehicle M may be provided independently of the navigation device 50. Further, the navigation device 50 may be realized by, for example, a function of a terminal device such as a smartphone or a tablet terminal owned by the user. In this case, transmission and reception of information are performed by wireless or wired communication between the terminal device and the vehicle control system 100.

The communication device 55 performs, for example, wireless communication using a cellular network, a Wi-Fi network, Bluetooth (registered trademark), dedicated short range communication (DSRC), or the like. For example, the communication device 55 performs vehicle-to-vehicle communication with another vehicle traveling around the host vehicle M.

The vehicle sensors 60 include a yaw rate sensor 60a that detects an angular velocity γ (yaw rate γ) around a vertical axis, a vehicle speed sensor 60b that detects a vehicle speed V, and the like. The vehicle sensors 60 may include an acceleration sensor that detects an acceleration, an azimuth sensor that detects a direction of the host vehicle M, and the like.

The display device 62 displays information as an image. The display device 62 includes, for example, a liquid crystal display (LCD) or an organic electroluminescence (EL) display device. In this embodiment, the display device 62 will be described as a head-up display that reflects an image on a front window of the host vehicle M and displays the image in the field of view of the vehicle occupant. The display device 62 may be a display device included in the navigation device 50 or a display device of an instrument panel that displays a state (speed or the like) of the host vehicle M. The speaker 64 outputs information as audio.

The operation device 70 includes, for example, an accelerator pedal, a steering wheel, a brake pedal, a shift lever, and the like. The operation detection sensor 72 that detects presence or absence or the amount of an operation by a driver is attached to the operation device 70. The operation detection sensor 72 includes, for example, an accelerator opening degree sensor, a steering torque sensor, a brake sensor, and a shift position sensor. The operation detection sensor 72 outputs an accelerator opening, a steering torque, a brake depression amount, a shift position, and the like as detection results to the travel control unit 188. Alternatively, the detection result of the operation detection sensor 72 may be directly output to the travel driving force output device 200, the steering device 210, or the brake device 220.

The changeover switch 80 is a switch that is operated by a vehicle occupant. The changeover switch 80 receives the operation of the vehicle occupant, generates a control mode designation signal for designating the control mode of the travel control unit 188 as either an automated driving mode or a manual driving mode, and outputs the control mode designation signal to the switching control unit 150. The automated driving mode is a driving mode in which the vehicle travels in a state in which the driver does not operate (or an operation amount is smaller than in the manual driving mode and an operation frequency is lower than in the manual driving mode) as described above, and more specifically, is a driving mode in which some or all of the travel driving force output device 200, the steering device 210, and the brake device 220 are controlled on the basis of an action plan. In addition to the operation of switching the automated driving mode, the changeover switch 80 may receive various operations. For example, when the information output from the vehicle control system 100 is presented to the vehicle occupant via the display device 62, the changeover switch 80 may receive an operation in response to the information, or the like.

The travel driving force output device 200, the steering device 210, and the brake device 220 will be described prior to the description of the vehicle control system 100.

The travel driving force output device 200 outputs a travel driving force (torque) for a traveling vehicle to driving wheels. When the host vehicle M is a car using an internal combustion engine as a power source, the travel driving force output device 200 includes, for example, an engine, a transmission, and an engine electronic control unit (ECU) for controlling the engine. When the host vehicle M is an electric car using an electric motor as a power source, the travel driving force output device 200 includes a travel motor, and a motor ECU that controls the travel motor. When the host vehicle M is a hybrid car, the travel driving force output device 200 includes an engine, a transmission, an engine ECU, a travel motor, and a motor ECU. When the travel driving force output device 200 includes only an engine, the engine ECU adjusts a throttle opening, a shift stage, or the like of the engine according to the information input from a travel control unit 188 to be described below. When the travel driving force output device 200 includes only a travel motor, the motor ECU adjusts a duty ratio of a PWM signal to be applied to the travel motor according to the information input from the travel control unit 188. When the travel driving force output device 200 includes an engine and a travel motor, the engine ECU and the motor ECU control the travel driving force in cooperation with each other according to the information input from the travel control unit 188.

The steering device 210 includes, for example, a steering ECU and an electric motor. The electric motor, for example, applies a force to a rack and pinion mechanism to change a orientation of a steering wheel. The steering ECU drives the electric motor according to the information input from the vehicle control system 100, or the input steering angle or steering torque information to change the orientation of the steering wheel.

The brake device 220 is, for example, an electric servo brake device including a brake caliper, a cylinder that transfers hydraulic pressure to the brake caliper, an electric motor that generates hydraulic pressure in the cylinder, and a brake control unit. The brake control unit of the electric servo brake device controls the electric motor according to the information input from the travel control unit 188 so that a brake torque according to a brake operation is output to each wheel. The electric servo brake device may include, as a backup, a mechanism that transfers the hydraulic pressure generated by an operation of the brake pedal to the cylinder via a master cylinder. The brake device 220 is not limited to the electric servo brake device described above, and may be an electronically controlled hydraulic brake device. The electronically controlled hydraulic brake device controls an actuator according to the information input from the travel control unit 188 and transfers the hydraulic pressure of the master cylinder to the cylinder. Further, the brake device 220 may include a regenerative brake using the travel motor that may be included in the travel driving force output device 200.

[Vehicle Control System]

Hereinafter, the vehicle control system 100 will be described. The vehicle control system 100 is realized by, for example, one or more processors or hardware having equivalent functions. The vehicle control system 100 may have a configuration in which a processor such as a central processing unit (CPU), a storage device, an electronic control unit (ECU) in which a communication interface is connected by an internal bus, a micro-processing unit (MPU), and the like are combined.

Referring back to FIG. 2, the vehicle control system 100 includes, for example, a target lane determination unit 110, an automated drive control unit 120, a travel control unit 188, and a storage unit 190. The automated drive control unit 120 includes, for example, an automated drive mode control unit 130, a host vehicle position recognition unit 140, an external environment recognition unit 142, an action plan generation unit 144, a trajectory generation unit 146, a switching control unit 150, and a host vehicle position correction unit 160. A combination of at least the navigation device 50, the host vehicle position recognition unit 140, and the host vehicle position correction unit 160 described above is an example of a "vehicle position determination device".

Each unit of the target lane determination unit 110 and the automated drive control unit 120 and a portion or all of the travel control unit 188 are realized by the processor executing a program (software). Further, some or all of these may be realized by hardware such as a large scale integration (LSI) circuit or an application specific integrated circuit (ASIC) or may be realized by a combination of software and hardware.

For example, information such as high-precision map information 192, target lane information 194, and action plan information 196 is stored in the storage unit 190. The storage unit 190 is realized by a read only memory (ROM), a random access memory (RAM), a hard disk drive (HDD), a flash memory, or the like. The program executed by the processor may be stored in the storage unit 190 in advance, or may be downloaded from an external device via in-vehicle Internet equipment or the like. Further, the program may be installed in the storage unit 190 by a portable storage medium having the program stored thereon being mounted on a drive device (not illustrated). Further, the vehicle control system 100 may be one distributed by a plurality of computer devices.

The target lane determination unit 110 is realized by, for example, an MPU. The target lane determination unit 110 divides a route provided from the navigation device 50 into a plurality of blocks (for example, divides the route every 100 [m] with respect to a vehicle traveling direction), and determines a target lane for each block by referring to the high-precision map information 192. The target lane determination unit 110 determines, for example, what lane from the left the vehicle travels along. For example, when there is a branching point, a merging point, or the like in the route, the target lane determination unit 110 determines the target lane so that the host vehicle M can travel along a reasonable travel route for traveling to a branch destination. The target lane determined by the target lane determination unit 110 is stored as target lane information 194 in the storage unit 190.

The high-precision map information 192 is map information that has higher precision than a navigation map of the navigation device 50 and is represented by a ground coordinate system $\Sigma_G$. The high-precision map information 192 includes, for example, information on a center of the lane or information on a boundary of the lane. Further, road information, traffic regulation information, address information (address and postal code), facility information, telephone number information, or the like may be included in the high-precision map information 192. The road information includes information indicating a type of road, such as highways, toll roads, national roads, and prefectural roads, the number of lanes of a road, a width of each lane, a slope of a road, a position of the road (three-dimensional coordinates including longitude, latitude, and height), curvatures of curves of lanes, positions of merging and branching points of a lane, or information on signs or the like provided on a road. The traffic regulation information includes information on blockage of lanes due to construction, traffic accidents, traffic jams, or the like.

The automated drive mode control unit 130 determines a mode of the automated driving that is performed by the automated drive control unit 120. The automated driving modes in this embodiment include the following modes. The following are merely examples, and the number of modes of automated driving may be set arbitrarily.

[Mode A]

Mode A is a mode in which a degree of automated driving is highest. When mode A is performed, all vehicle controls such as complex merging control are automatically performed. Therefore, the vehicle occupant does not need to monitor the vicinity or the state of the host vehicle M.

[Mode B]

Mode B is a mode in which a degree of automated driving is next highest after mode A. When mode B is performed, all vehicle controls are automatically performed in principle, but a driving operation of the host vehicle M is entrusted to the vehicle occupant according to a situation. Therefore, the vehicle occupant needs to monitor the vicinity or the state of the host vehicle M.

[Mode C]

Mode C is a mode in which the degree of automated driving is next highest after mode B. When mode C is performed, the vehicle occupant needs to perform a confirmation operation according to a situation with respect to the changeover switch 80. In mode C, for example, when the vehicle occupant is notified of a lane changing timing and performs an operation for instructing lane changing with respect to the changeover switch 80, automatic lane change is performed. Therefore, the vehicle occupant needs to monitor the vicinity or the state of the host vehicle M.

The automated drive mode control unit 130 determines an automated driving mode on the basis of an operation of the vehicle occupant with respect to the changeover switch 80, the event determined by the action plan generation unit 144, the travel condition determined by the trajectory generation unit 146, and the like. Further, in the automated driving mode, a limit according to performance of the detection device DD of the host vehicle M, or the like may be set. For example, when the performance of the detection device DD is low, mode A may not be performed. In any of the modes, switching to a manual driving mode (override) can be performed by an operation with respect to the changeover switch 80.

The host vehicle position recognition unit 140 of the automated drive control unit 120 recognizes the lane center CL of the target lane determined by the target lane determination unit 110 on the basis of the information input from the finders 20, the radars 30, the camera 40, the navigation device 50, or the vehicle sensors 60. First, the host vehicle position recognition unit 140 recognizes which lane is the target lane on the basis of the information. The host vehicle position recognition unit 140, for example, compares a pattern (for example, an arrangement of solid and broken lines) of a road division line recognized from the high-precision map information 192 with a pattern of a road division line near the host vehicle M recognized from the image captured by the camera 40 to recognize which lane is the target lane. In this recognition, a processing result of the INS may be added. The host vehicle position recognition unit 140 recognizes the position of the lane center CL of the recognized target lane.

Figure 3:
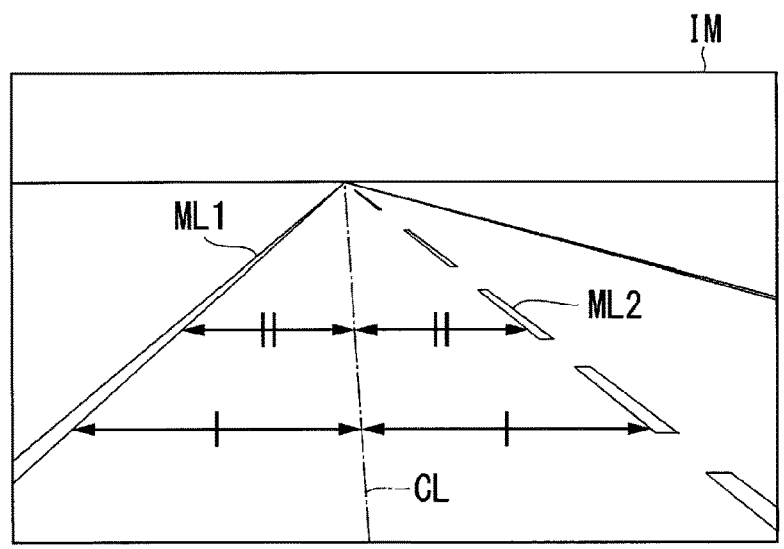
FIG. 3 is a diagram illustrating an example of a situation in which a lane center CL is recognized.

FIG. 3 is a diagram illustrating an example of a situation in which the lane center CL is recognized. In FIG. 3, IM indicates, for example, a captured image of the camera 40 or a virtual area in which an output of the finder 20 or the radar 30 is integrated in a bird's-eye view. In FIG. 3, CL indicates a lane center of the target lane, ML1 indicates one of road dividing lines of a host lane, and ML2 indicates the other of the road division lines.

As illustrated, for example, the host vehicle position recognition unit 140 recognizes a point at an intermediate distance between the road division lines ML1 and ML2 as the lane center CL on the basis of the positional relationship between the road division lines ML1 and ML2.

After recognizing the lane center CL, the host vehicle position recognition unit 140 recognizes the lane (travel lane) on which the host vehicle M is traveling, and the relative position of the host vehicle M relative to the travel lane on the basis of information input from the high-precision map information 192, the finder 20, the radar 30, the camera 40, the navigation device 50, or the vehicle sensor 60.

Figure 4:
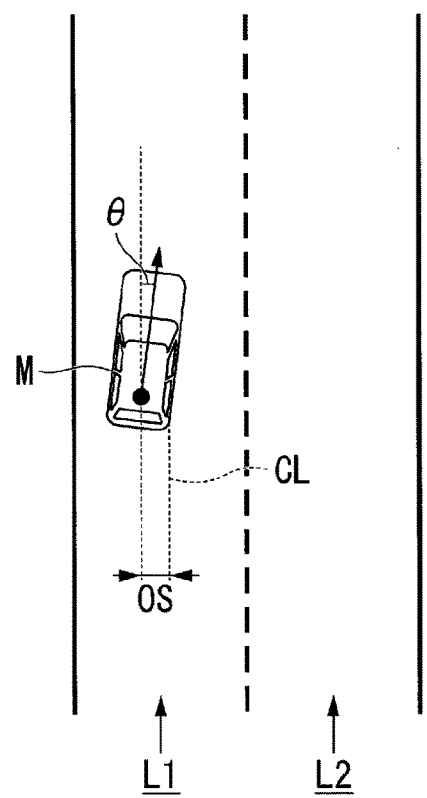
FIG. 4 is a diagram illustrating a state in which a relative position of the host vehicle M relative to a travel lane L1 is recognized by a host vehicle position recognition unit 140.

FIG. 4 is a diagram illustrating a state in which a relative position of the host vehicle M with respect to a travel lane L1 is recognized by the host vehicle position recognition unit 140. The vehicle position recognition unit 140 recognizes, for example, a divergence OS from a travel lane center CL of a reference point (for example, the centroid) of the host vehicle M and an angle θ formed between a traveling direction of the host vehicle M and a line connected to the travel lane center CL, as the relative position of the host vehicle M with respect to the travel lane L1. Instead of this, the host vehicle position recognition unit 140 may recognize, for example, a position of a reference point of the host vehicle M with respect to any one of side ends of the host vehicle lane L1 as the relative position of the host vehicle M with respect to the travel lane. The relative position of the host vehicle M recognized by the host vehicle position recognition unit 140 is provided to the target lane determination unit 110.

The external environment recognition unit 142 recognizes a state such as a position, a speed, or an acceleration of surrounding vehicles on the basis of the information input from the finder 20, the radar 30, the camera 40, or the like. A surrounding vehicle is, for example, a vehicle that is traveling near the host vehicle M, which is a vehicle that is traveling in the same direction as the host vehicle M. A position of the surrounding vehicle may be represented by a representative point such as the centroid or a corner of another vehicle or may be represented by a region represented by an outline of the other vehicle. The "state" of the surrounding vehicle may include an acceleration of the surrounding vehicle, and whether or not the surrounding vehicle is changing lanes (or whether the surrounding vehicle is trying to change lanes), which is recognized on the basis of the information of the various devices. Further, the external environment recognition unit 142 may recognize positions of guard rails, utility poles, parked vehicles, pedestrians, or other objects, in addition to surrounding vehicles.

The action plan generation unit 144 sets a start point of automated driving and/or a destination of automated driving. The start point of automated driving may be a current position of the host vehicle M or a point at which an operation for instructing automated driving is performed. The action plan generation unit 144 generates an action plan in a section between the start point and the destination of automated driving. However, the present invention is not limited thereto, and the action plan generation unit 144 may generate an action plan for an arbitrary section.

The action plan includes, for example, a plurality of events that are executed sequentially. The events include, for example, a deceleration event in which the host vehicle M is caused to decelerate, an acceleration event in which the host vehicle M is caused to accelerate, a lane keeping event in which the host vehicle M is caused to travel so that the host vehicle M does not deviate from a travel lane, a lane changing event in which the travel lane is caused to be changed, a overtaking event in which the host vehicle M is caused to overtake a preceding vehicle, a branching event in which a change to a desired lane occurs at a branching point or the host vehicle M is caused to travel so as not to deviate from a current travel lane, a merging event in which the host vehicle M is caused to be accelerated or decelerated in a merging lane for merging with a main lane and the travel lane is caused to be changed, and a handover event in which the driving mode is caused to transition from an automated driving mode to a manual driving mode at a scheduled end point of the automated driving mode. The action plan generation unit 144 sets a lane changing event, a branching event, or a merging event at a point at which the target lane determined by the target lane determination unit 110 is switched. Information indicating the action plan generated by the action plan generation unit 144 is stored as the action plan information 196 in the storage unit 190.

Figure 5:
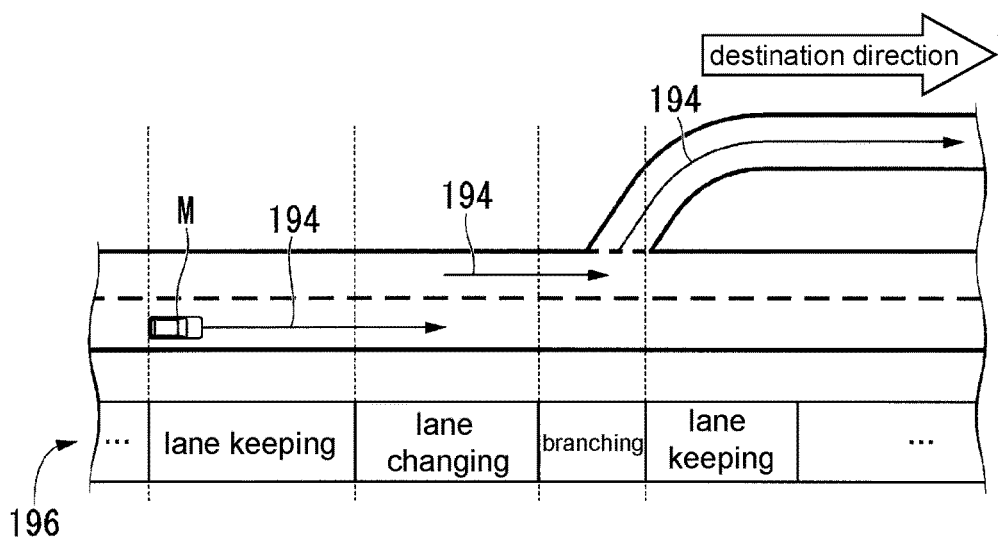
FIG. 5 is a diagram illustrating an example of an action plan generated for a certain section.

FIG. 5 is a diagram illustrating an example of an action plan generated for a certain section. As illustrated in FIG. 5, the action plan generation unit 144 generates an action plan required for the host vehicle M to travel along a target lane indicated by the target lane information 194. The action plan generation unit 144 may dynamically change the action plan regardless of the target lane information 194 according to changes in a situation of the host vehicle M. For example, the action plan generation unit 144 may change an event set in a driving section in which the host vehicle M is scheduled to travel when a speed of a surrounding vehicle recognized by the external environment recognition unit 142 during the traveling of the vehicle exceeds a threshold value or a moving direction of a surrounding vehicle traveling in a lane adjacent to the host vehicle lane is directed to a moving direction in the host vehicle lane. For example, when an event is set so that a lane changing event is executed after a lane keeping event, and it is found from a recognition result of the external environment recognition unit 142 that a vehicle is traveling at a speed equal to or higher than a threshold value from the rear in a lane that is a lane change destination in the lane keeping event, the action plan generation unit 144 may change the event subsequent to the lane keeping event from a lane changing event to a deceleration event or a lane keeping event. As a result, the vehicle control system 100 can cause the host vehicle M to automatically travel safely even when a change in a state of the external environment occurs.

Figure 6:
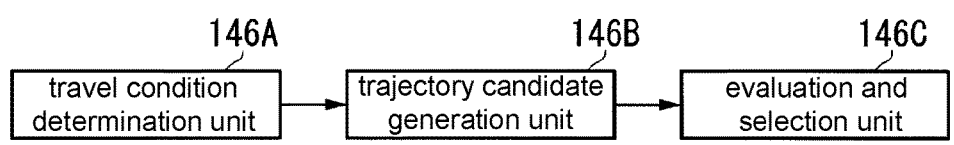
FIG. 6 is a diagram illustrating an example of a configuration of a trajectory generation unit 146.

FIG. 6 is a diagram illustrating an example of a configuration of the trajectory generation unit 146. The trajectory generation unit 146 includes, for example, a travel condition determination unit 146A, a trajectory candidate generation unit 146B, and an evaluation and selection unit 146C.

For example, when a lane keeping event is performed, the travel condition determination unit 146A determines a travel condition of any one of constant speed travel, follow-up travel, low-speed follow-up travel, deceleration travel, cornering, obstacle avoidance travel, and the like. In this case, the travel condition determination unit 146A determines the travel condition to be constant speed travel when there are no other vehicles ahead of the host vehicle M. Further, the travel condition determination unit 146A determines the travel condition as follow-up travel when traveling by following a preceding vehicle. Further, the travel condition determination unit 146A determines the travel condition to be low-speed follow-up travel in a traffic jam situation or the like. Further, the travel condition determination unit 146A determines the travel condition to be deceleration travel when deceleration of a preceding vehicle is recognized by the external environment recognition unit 142 or when an event such as stopping or parking of a vehicle is performed. Further, when the external environment recognition unit 142 recognizes that the host vehicle M has reached a curved road, the travel condition determination unit 146A determines the travel condition to be cornering. Further, the travel condition determination unit 146A determines the travel condition to be obstacle avoidance travel when the external environment recognition unit 142 recognizes an obstacle in front of the host vehicle M. Further, when a lane change event, a overtaking event, a branching event, a merging event, a handover event, or the like is performed, the travel condition determination unit 146A determines the travel condition according to each event.

Figure 7:
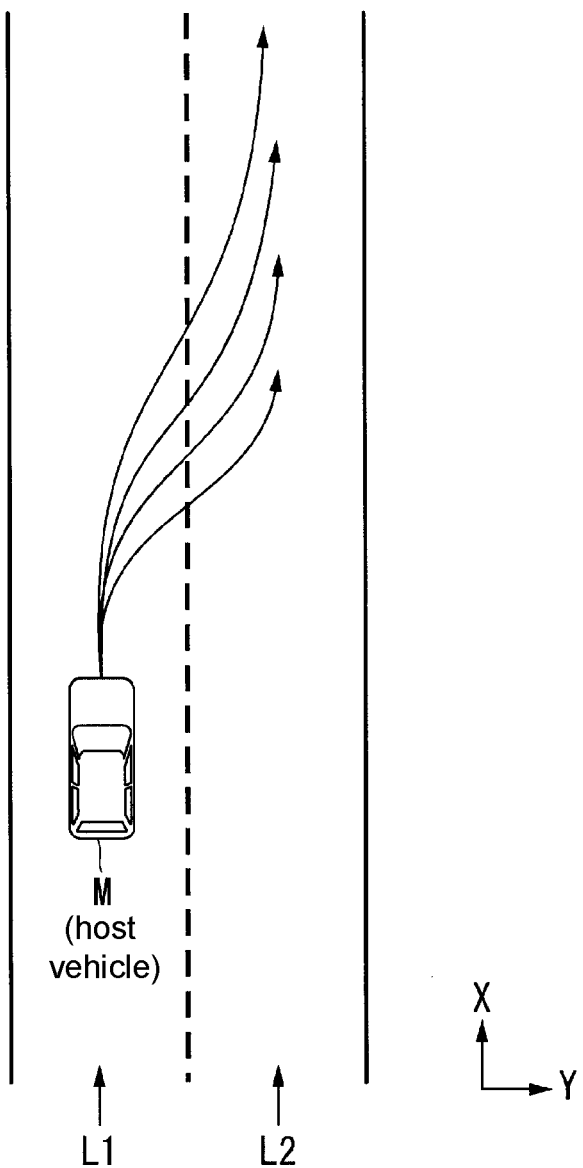
FIG. 7 is a diagram illustrating an example of a trajectory candidate generated by a trajectory candidate generation unit 146B.

The trajectory candidate generation unit 146B generates candidates for a trajectory on the basis of the travel aspect determined by the travel condition determination unit 146A. FIG. 7 is a diagram illustrating an example of candidates for a trajectory generated by the trajectory candidate generation unit 146B. FIG. 7 illustrates the candidates for the trajectory generated when the host vehicle M changes a lane from a lane L1 to a lane L2.

The trajectory candidate generation unit 146B determines a trajectory as illustrated in FIG. 7, for example, as a collection of target positions (trajectory points K) that a reference position (for example, the centroid or a rear wheel shaft center) on the host vehicle M will reach, at future predetermined time intervals, for example, with reference to a position ($X_{act}$, $Y_{act}$) of the host vehicle M determined by the navigation device 50. That is, the trajectory candidate generation unit 146B generates the trajectory that is the collection of trajectory points K on the traveling direction side of the vehicle with reference to the position ($X_{act}$, $Y_{act}$) of the host vehicle M.

Figure 8:
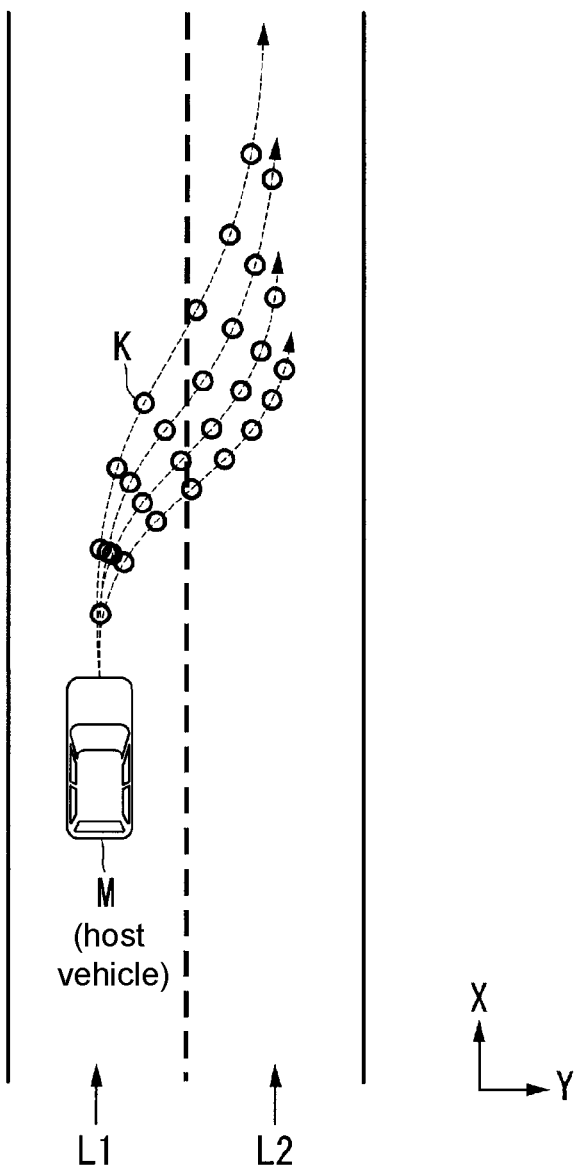
FIG. 8 is a diagram in which the trajectory candidate generated by the trajectory candidate generation unit 146B is represented by a trajectory point K.

FIG. 8 is a diagram in which candidates for the trajectories generated by the trajectory candidate generation unit 146B are represented by the trajectory points K. As an interval between the trajectory points K becomes wider, the speed of the host vehicle M increases, and as the interval between the trajectory points K becomes narrower, the speed of the host vehicle M decreases. Therefore, the trajectory candidate generation unit 146B gradually increases the interval between the trajectory points K when acceleration is desired, and gradually decreases the interval between the trajectory points K when deceleration is desired.

Thus, since the trajectory point K includes a speed component, the trajectory candidate generation unit 146B needs to apply a target speed to each trajectory point K. The target speed is determined according to the travel condition determined by the travel condition determination unit 146A.

Figure 9:
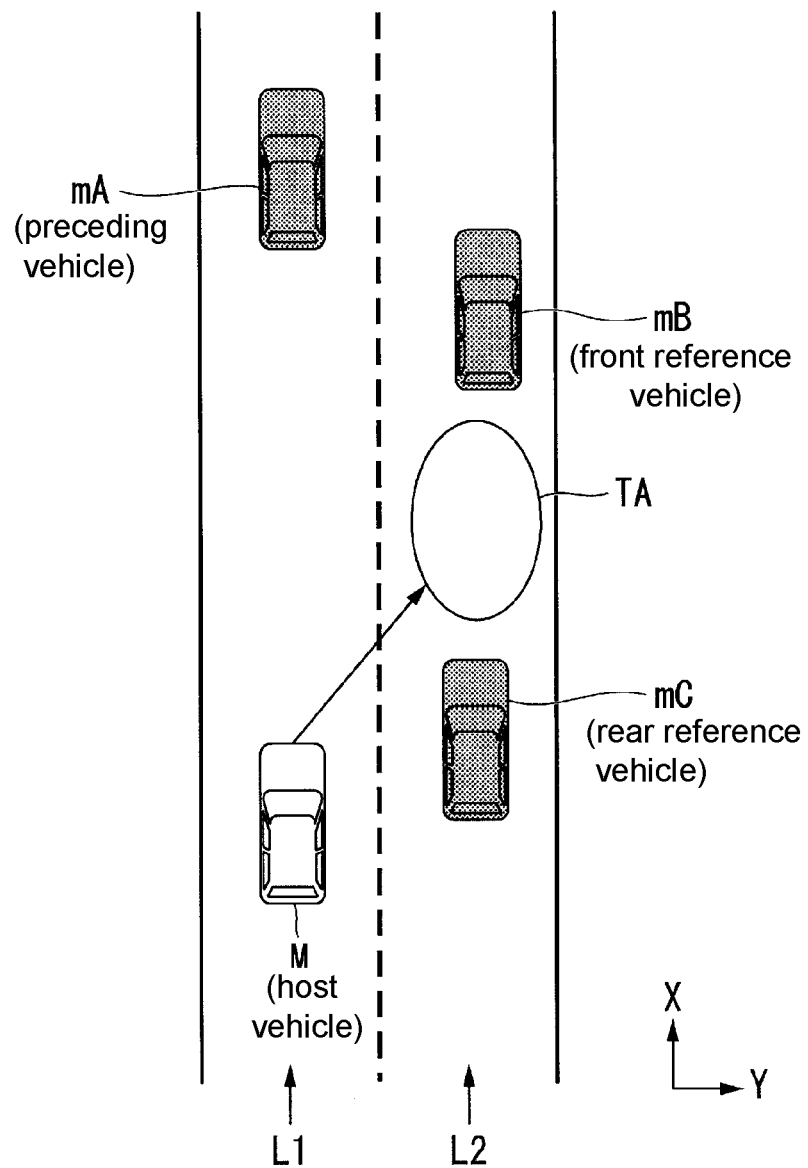
FIG. 9 is a diagram illustrating a lane change target position TA.

Here, a scheme of determining the target speed when lane change (including branching) is performed will be described. The trajectory candidate generation unit 146B first sets a lane change target position (or a merging target position). The lane change target position is set as a relative position with respect to surrounding vehicles, and is intended to determine "surrounding vehicles between which the lane change is performed". The trajectory candidate generation unit 146B determines the target speed when the lane change is performed in consideration of three surrounding vehicles with reference to the lane change target position. FIG. 9 is a diagram illustrating the lane change target position TA. In FIG. 9, L1 indicates a host lane, and L2 indicates an adjacent lane. Here, a surrounding vehicle traveling immediately before the host vehicle M in the same lane as the host vehicle M is defined as a preceding vehicle mA, a surrounding vehicle traveling immediately before the lane change target position TA is defined as a front reference vehicle mB, and a surrounding vehicle traveling immediately after the lane change target position TA is defined as a rear reference vehicle mC. The host vehicle M needs to perform acceleration and deceleration to move to the side of the lane change target position TA, but in this case, the host vehicle M needs to avoid catching up with the preceding vehicle mA. Therefore, the trajectory candidate generation unit 146B predicts future states of the three surrounding vehicles, and determines a target speed such that there is no interference with each surrounding vehicle.

Figure 10:
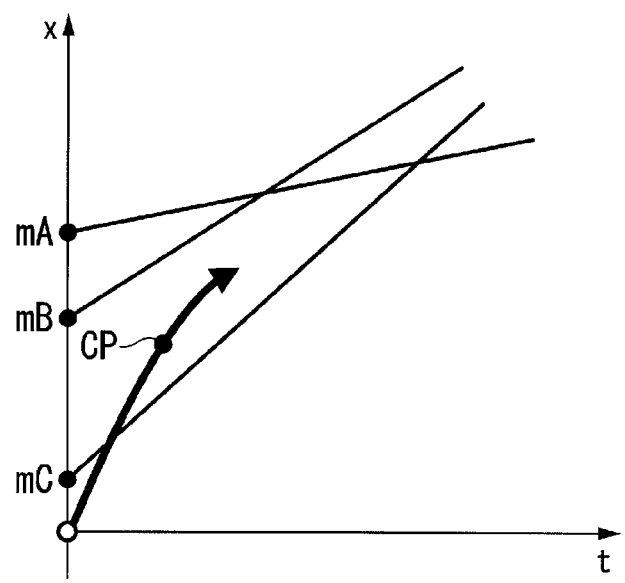
FIG. 10 is a diagram illustrating a speed generation model when speeds of three surrounding vehicles are assumed to be constant.

FIG. 10 is a diagram illustrating a speed generation model when speeds of three surrounding vehicles are assumed to be constant. In FIG. 10, straight lines extending from mA, mB, and mC indicate displacements in the traveling direction when the respective surrounding vehicles are assumed to travel at constant speed. The host vehicle M needs to be between the front reference vehicle mB and the rear reference vehicle mC at a point CP at which the lane change is completed, and behind the preceding vehicle mA at a point before the point CP. Under such constraints, the trajectory candidate generation unit 146B derives a plurality of time series patterns of a target speed before the lane change is completed. By applying the time series patterns of the target speed to a model such as a spline curve, a plurality of candidates for the trajectory as illustrated in FIG. 8 are derived. A motion pattern for the three surrounding vehicles is not limited to constant speeds as illustrated in FIG. 10, and may be predicted on the assumption of constant accelerations or constant jerks.

The evaluation and selection unit 146C, for example, evaluates candidates for the trajectory generated by the trajectory candidate generation unit 146B from two viewpoints of plannability and safety, and selects the trajectory to be output to the travel control unit 188. From the point of view of plannability, for example, when follow-up with respect to an already generated plan (for example, action plan) is high and a total length of the trajectory is short, the evaluation of the trajectory is high. For example, when a lane change to the right is desired, the evaluation of a trajectory returning after a temporary lane change to the left is low. From the viewpoint of safety, for example, when a distance between the host vehicle M and an object (for example, a surrounding vehicle) is great at each trajectory point and the amount of change in the acceleration/deceleration or the steering angle is small, the evaluation is high.

The switching control unit 150 switches between the automated driving mode and the manual driving mode on the basis of the signal input from the automated driving changeover switch 80. Further, the switching control unit 150 switches from the automated driving mode to the manual driving mode on the basis of an operation of instructing acceleration/deceleration or steering with respect to the operation device 70. For example, the switching control unit 150 may switch from the automated driving mode to the manual driving mode (overriding) when an operation amount indicated by the signal input from the operation device 70 exceeding a threshold value continues for a reference time or more. Further, the switching control unit 150 may cause a return to the automated driving mode to occur when an operation with respect to the operation device 70 is not detected for a predetermined time after switching to the manual driving mode is performed by overriding.

Hereinafter, the travel control unit 188 will be described prior to description of the host vehicle position correction unit 160. The travel control unit 188 controls the travel driving force output device 200, the steering device 210, and the brake device 220 so that the host vehicle M passes through the trajectory generated by the trajectory candidate generation unit 146B according to a scheduled time.

Figure 11:
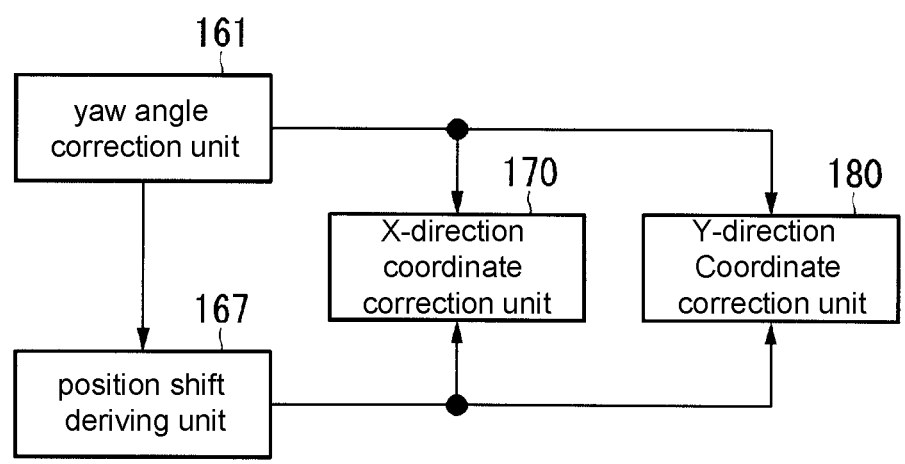
FIG. 11 is a diagram illustrating an example of a configuration of a host vehicle position correction unit 160.

FIG. 11 is a diagram illustrating an example of a configuration of the host vehicle position correction unit 160. The host vehicle position correction unit 160 includes, for example, a yaw angle correction unit 161, a position shift deriving unit 167, an X-direction coordinate correction unit 170, and a Y-direction coordinate correction unit 180. The host vehicle position correction unit 160 is an example of a "control unit" in the claims.

[Process of Correcting Yaw Angle]

Figure 12:
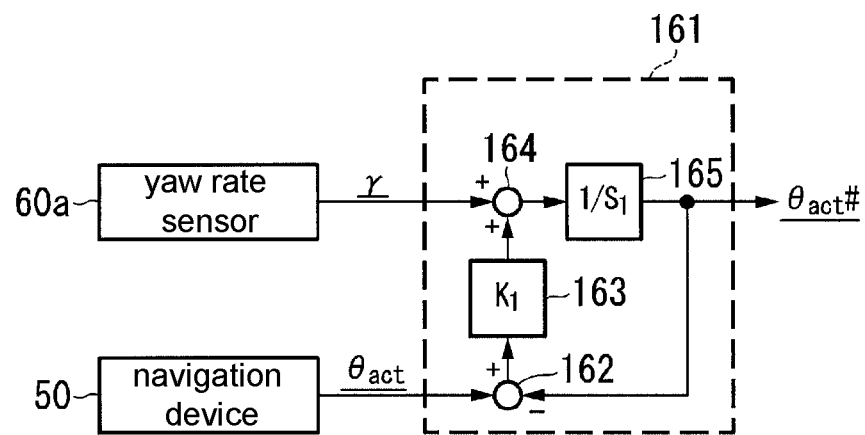
FIG. 12 illustrates an example of a configuration of a yaw angle correction unit 161.

FIG. 12 is an example of a configuration of the yaw angle correction unit 161. The yaw angle correction unit 161 includes, for example, a subtractor 162, a proportional control unit 163, an adder 164, and an integral control unit 165. The subtractor 162 derives a deviation (hereinafter referred to as a yaw angle deviation) obtained by subtracting the yaw angle output by the integral control unit 165 from the yaw angle $\theta_{act}$ specified by the navigation device 50. The subtractor 162 outputs the derived yaw angle deviation to the proportional control unit 163.

The proportional control unit 163 multiplies the yaw angle deviation output by the subtractor 162 by a predetermined proportional gain $K_1$, and outputs the gain-adjusted yaw angle deviation to the adder 164.

The adder 164 adds the angular velocity y detected by the yaw rate sensor 60a to the yaw angle deviation output by the proportional control unit 163, and outputs a correction amount obtained by the addition to the integral control unit 165. The correction amount output by the adder 164 is an example of a "required correction amount".

The integral control unit 165 integrates the correction amounts sequentially output by the adder 164 over a predetermined time, and multiplies a resultant integral value by a predetermined integral gain. That is, the integral control unit 165 corrects the yaw angle $\theta_{act}$ with the correction amount obtained by multiplying the movement amount (displacement angle) based on the angular speed γ (a part of the required correction amount) output over at least a predetermined time by a predetermined integral gain. Accordingly, the current yaw angle $\theta_{act}$ is corrected with the correction amount based on the yaw angle $\theta_{act}$ corrected in the past. The predetermined time may be a time required when a vehicle travels a predetermined distance. Through such a process, the yaw angle $\theta_{act}$ specified by the navigation device 50 is corrected to such an angle that the yaw angle deviation is eliminated, on the basis of the movement amount (displacement angle) required when the host vehicle M travels for a predetermined time or a predetermined distance. In the following description, the yaw angle $\theta_{act}$ corrected on the basis of the yaw angle deviation is referred to as a yaw angle $\theta_{act}\#$. The integral control unit 165 outputs the corrected yaw angle $\theta_{act}\#$ to the subtractor 162, the position shift deriving unit 167, the X-direction coordinate correction unit 170, and the Y-direction coordinate correction unit 180.

The position shift deriving unit 167 derives the shift amount $\Delta L_{act}$ of the position of the host vehicle M with respect to the reference position of the lane on which the host vehicle M travels, that is, the target lane determined by the target lane determination unit 110. The reference position of the target lane may be set, for example, at the lane center CL or a division line which partitions off the target lane. In the following description, for example, the reference position of the target lane is assumed to be a lane center CL.

Further, the position shift deriving unit 167 derives a shift amount $\Delta L_{ref}$ between a predetermined trajectory point K among the plurality of trajectory points K included in the trajectory generated by the trajectory generation unit 146 and the lane center CL of the target lane. The predetermined trajectory point K is, for example, a trajectory point K closest to the current position of the host vehicle M (the position coordinates ($X_{act}$, $Y_{act}$) specified by the navigation device 50). Both of the shift amount $\Delta L_{act}$ and the shift amount $\Delta L_{ref}$ are shift amounts regarding the lane width direction.

Figure 13:
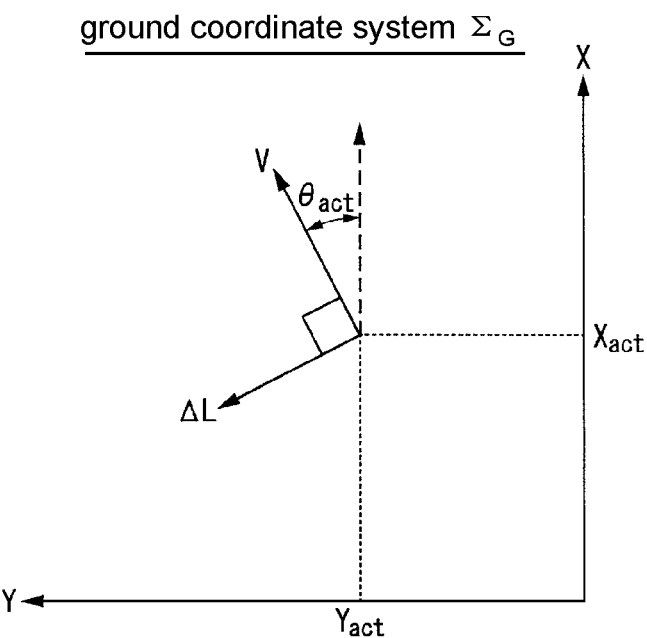
FIG. 13 is a diagram illustrating a relationship between a ground coordinate system $\Sigma_G$ represented by GNSS and position coordinates of a host vehicle M.

FIG. 13 is a diagram illustrating a relationship between a ground coordinate system $\Sigma_G$ represented by the GNSS and the position coordinates of the host vehicle M. Arrows X and Y indicate axes of an X-Y plane of a ground coordinate system $\Sigma_G$. Further, an arrow V, indicates a vector indicating a speed of the host vehicle M, and indicates a traveling direction of the host vehicle M. Further, an arrow $\Delta L$ indicates a vector orthogonal to the arrow V. As illustrated, the yaw angle $\theta_{act}$ indicates how much the host vehicle M is inclined with respect to the X axis. In the following description, the Y-axis of the ground coordinate system $\Sigma_G$ is assumed to use the lane center CL of the target lane as an origin.

Figure 14:
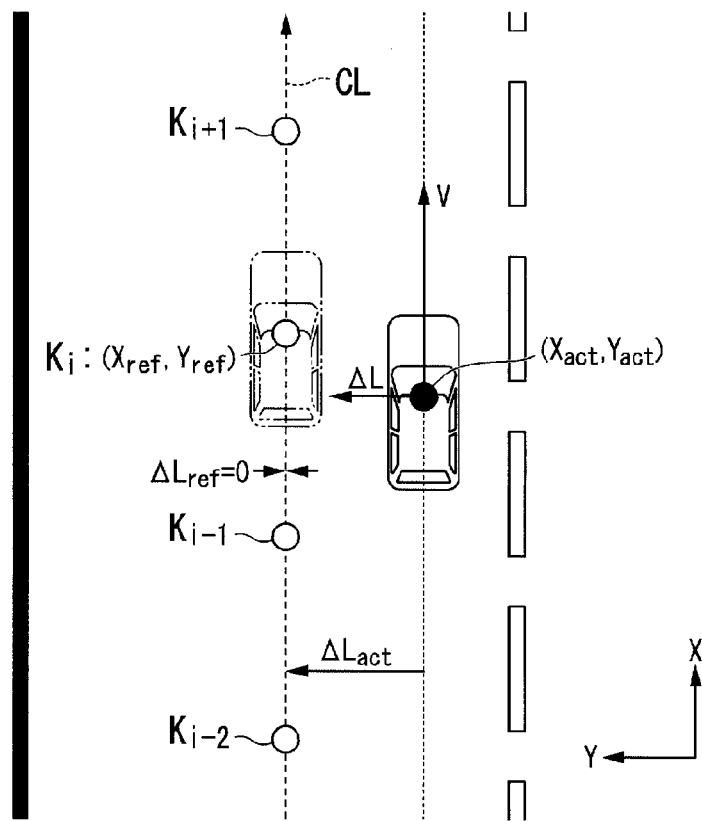
FIG. 14 is a diagram schematically illustrating a method of deriving a shift amount $\Delta L_{act}$ and a shift amount $\Delta L_{ref}$.

FIG. 14 is a diagram schematically illustrating a method of deriving the shift amount $\Delta L_{act}$ and the shift amount $\Delta L_{ref}$. In the illustrated example, the description is given on the assumption that the direction X indicated by the ground coordinate system $\Sigma_G$ and the traveling direction V of the host vehicle M, and the direction Y indicated by the ground coordinate system $\Sigma_G$ and a direction $\Delta L$ orthogonal to the traveling direction V are the same direction (positive and negative relationships are the same). The coordinates ($X_{act}$, $Y_{act}$) indicate the current position of the host vehicle M, and the coordinates ($X_{ref}$, $Y_{ref}$) indicate a position of the trajectory point $K_i$ closest to the coordinates ($X_{act}$, $Y_{act}$). The "closest trajectory point $K_i$" is a trajectory point $K_i$ for which a distance from the coordinates ($X_{act}$, $Y_{act}$) indicating the current position of the host vehicle M is shortest. Here, when there are a plurality of closest trajectory points $K_i$, the trajectory points $K_{i-1}$ ... that are target positions at a past time $t_{i-1}$ ... with reference to a current time $t_i$ are excluded. Accordingly, it is possible to prevent going back in time by adopting a past trajectory point K among the trajectory points K having a relationship of being continuous in time series. As a result, the behavior of the vehicle can be stabilized.

Further, the trajectory point $K_1$ to be reached at the current time $t_i$ may be adopted as the closest trajectory point K regardless of the distance from the current position of the host vehicle M. Further, for example, a trajectory point $K_{1+1}$ that is a target position of the time $t_{i+1}$ next to the current time $t_i$ may be adopted as the closest trajectory point K, in addition to the trajectory point $K_1$ corresponding to the current time $t_i$.

In the illustrated example, since the Y-axis of the ground coordinate system $\Sigma_G$ uses the lane center CL as the origin, the shift amount $\Delta L_{act}$ is derived as a positive value. Further, since the trajectory is set to overlap the lane center CL, the shift amount $\Delta L_{ref}$ is derived as zero. The shift amount $\Delta L_{ref}$ may not be zero according to an arrangement position of the trajectory.

Figure 15:
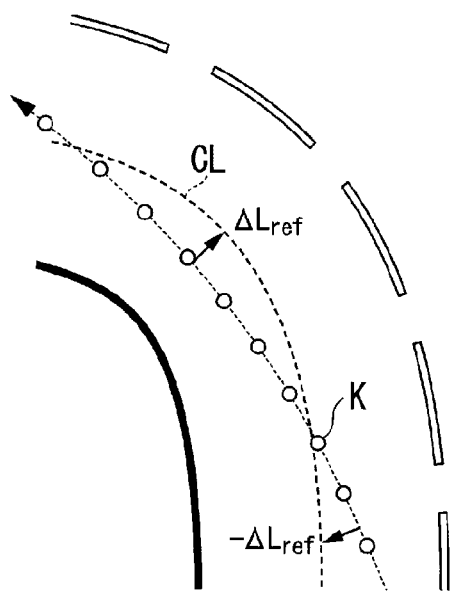
FIG. 15 is a diagram illustrating an example of a situation in which a trajectory is not arranged along a lane center CL.

FIG. 15 is a diagram illustrating an example of a situation in which a trajectory is not arranged along a lane center CL. As illustrated, for example, when a target lane is a curved road bent to the left, the trajectory generation unit 146 arranges a trajectory point K to the right from the lane center CL in a stage before a vehicle reaches the curved road in order to decrease a frequency of acceleration and deceleration, and generates a trajectory in which the trajectory point K is gradually shifted from the right to the left of the lane center CL in a stage in which the vehicle travels on the curved road. That is, the trajectory generation unit 146 generates a trajectory for causing the host vehicle M to travel from the outside of the curved road (out) to the inside (in). In this case, it is possible to reduce a load on an occupant of the vehicle and decrease a frequency of acceleration and deceleration since the host vehicle M travels while gently turning as compared with a situation in which the trajectory point K is arranged along the lane center CL.

Figure 16:
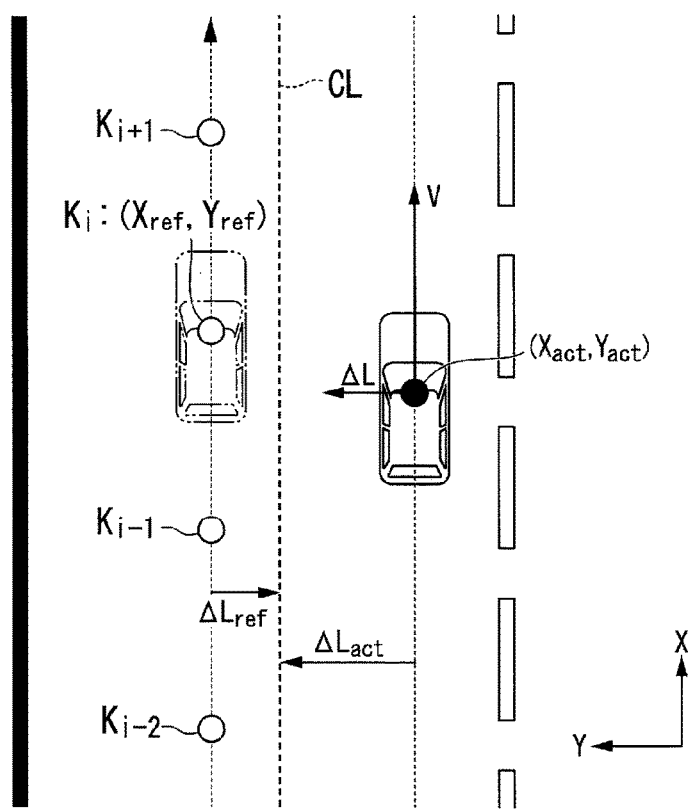
FIG. 16 is a diagram schematically illustrating a method of deriving the shift amount $\Delta L_{act}$ and the shift amount $\Delta L_{ref}$ in a situation that a trajectory is shifted to the left side of the lane center CL.

FIG. 16 is a diagram schematically illustrating a method of deriving the shift amount $\Delta L_{act}$ and the shift amount $\Delta L_{ref}$ in a situation that a trajectory is shifted to the left side of the lane center CL. In the illustrated example, since the Y axis of the ground coordinate system $\Sigma_G$ uses the lane center CL as an origin, the shift amount $\Delta L_{act}$ is derived as a positive value, and the shift amount $\Delta L_{ref}$ is derived as a negative value.

The position shift deriving unit 167 derives the shift amount of the position of the host vehicle M with respect to the trajectory point $K_i$ closest to the current position of the host vehicle M on the basis of the shift amount $\Delta L_{act}$ and the shift amount $\Delta L_{ref}$ that have been derived, and the corrected yaw angle $\theta_{act}\#$ derived by the yaw angle correction unit 161. In the following description, an X-direction component of the shift amount in the ground coordinate system $\Sigma_G$ is referred to as an $X_{sht}$, and a Y-direction component is referred to $Y_{sht}$.

The position shift deriving unit 167 derives the shift amount of the X-direction component $X_{sht}$ by referring to Equation (1) below.

$$X_{sht} = \cos(\theta_{act}\# + \frac{\pi}{2}) \cdot (A - B) \quad (1)$$

A parameter A of Equation (1) is expressed by Equation (2), and a parameter B in Equation (1) is expressed by Equation (3). The parameter A is an example of a "first deviation", and the parameter B is an example of a "second difference".

$$A = -(\Delta L_{ref} - \Delta L_{act}) \quad (2)$$

$$B = \Delta X \cdot \cos(\theta_{act}\# + \frac{\pi}{2}) + \Delta Y \cdot \sin(\theta_{act}\# + \frac{\pi}{2}) \quad (3)$$

$\Delta X$ in Equation (3) is expressed by Equation (4), and $\Delta Y$ in Equation (3) is expressed by Equation (5).

$$\Delta X = X_{ref} - X_{act} \quad (4)$$

$$\Delta Y = Y_{ref} - Y_{act} \quad (5)$$

As illustrated in Equation (2), the parameter A has a value obtained in consideration of the deviation (negative deviation in FIG. 16) of the trajectory point $K_i$ closest to the current relative position of the host vehicle M relative to the travel lane center CL and the deviation (positive deviation in FIG. 16) of the current relative position of the host vehicle M relative to the travel lane center CL with reference to the lane center CL of the target lane set on the basis of the image captured by the camera 40. Further, as illustrated in Equations (3) to (5), the parameter B has a value indicating a deviation according to the position information $(X_{act}, Y_{act})$ acquired by the GNSS receiver of the navigation device 50, which is a deviation between the trajectory point $K_i$ closest to the current position of the host vehicle M and the current position of the host vehicle M. That is, the term (A-B) expresses a difference (error) between the position of the host vehicle M determined by the camera 40 and the position of the host vehicle M determined by the GNSS receiver of the navigation device 50.

Further, the position shift deriving unit 167 derives the shift amount $Y_{sht}$ in the Y-direction component by referring to Equation (6) below. The parameters A and B in Equation (6) are the same as those in Equations (2) and (3) described above.

$$Y_{sht} = \sin(\theta_{act}\# + \frac{\pi}{2}) \cdot (A - B) \quad (6)$$

The position shift deriving unit 167 outputs the derived shift amount $X_{sht}$ in the X-direction component to the X-direction coordinate correction unit 170, and outputs the shift amount $Y_{sht}$ in the Y-direction component to the Y-direction coordinate correction unit 180.

[Position Correction Process of X-direction]

Figure 17:
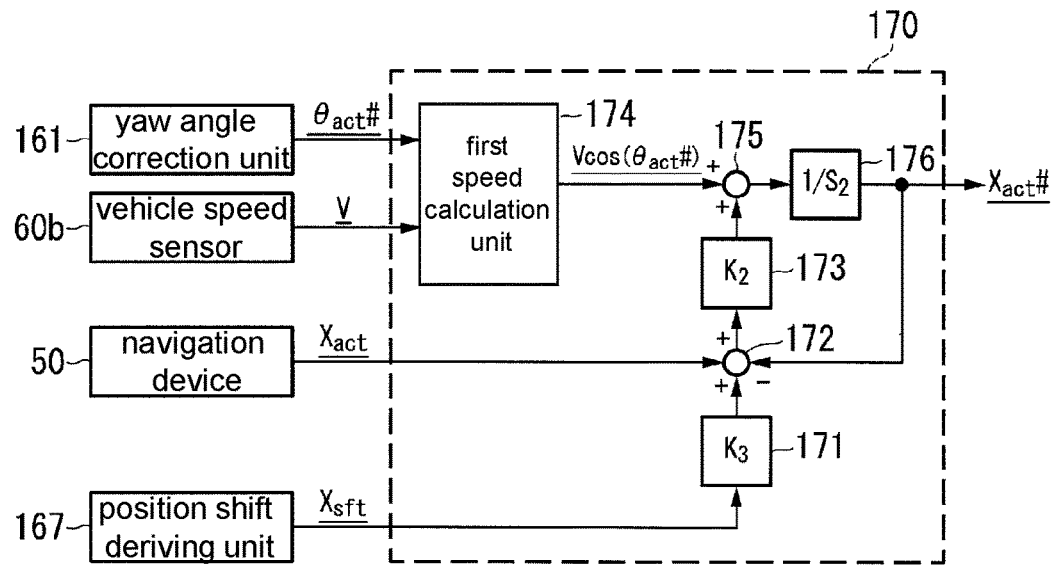
FIG. 17 illustrates an example of a configuration of an X-direction coordinate correction unit 170.

FIG. 17 illustrates an example of a configuration of the X-direction coordinate correction unit 170. The X-direction coordinate correction unit 170 includes, for example, a proportional control unit 171, an adder/subtractor 172, a proportional control unit 173, a first speed calculation unit 174, an adder 175, and an integral control unit 176.

The proportional control unit 171 multiplies the shift amount $X_{sht}$ of the X-direction component output by the position shift deriving unit 167 by a predetermined proportional gain $K_3$, and outputs this gain-adjusted shift amount $X_{sht}$ to the adder/subtractor 172. The proportional gain $K_3$ may be the same as or may be different from the proportional gain $K_1$ described above.

The adder/subtractor 172 adds the shift amount $X_{sht}$ of the X-direction component output by the proportional control unit 171 to the coordinate $X_{act}$ derived by the navigation device 50, and derives a deviation (hereinafter referred to as an X-direction deviation) by subtracting the position coordinate in the X-direction output by the integral control unit 176 from a resultant addition value. The adder/subtractor 172 outputs the derived X-direction deviation to the proportional control unit 173.

The proportional control unit 173 multiplies the X-direction deviation output by the adder/subtractor 172 by a predetermined proportional gain $K_2$, and outputs the gain-adjusted X-direction deviation to the adder 175. The proportional gain $K_2$ may be the same as or may be different from the proportional gain $K_1$ or the proportional gain $K_3$ described above.

The first speed calculation unit 174 calculates the speed $V_X$ of the X-direction component in the ground coordinate system $\Sigma_G$ on the basis of the corrected yaw angle $\theta_{act}\#$ output by the yaw angle correction unit 161 and the vehicle speed V detected by the vehicle speed sensor 60b. For example, the speed $V_X$ is expressed by Equation (7). The first speed calculation unit 174 outputs the calculated velocity $V_X$ of the X-direction component to the adder 175.

$$V_X = V \cos(\theta_{act}\#) \quad (7)$$

The adder 175 adds the speed $V_X$ of the X-direction component output by the first speed calculation unit 174 to the X-direction deviation output by the proportional control unit 173, and outputs a correction amount obtained by the addition to the integral control unit 176. The correction amount output by the adder 175 is another example of a "required correction amount".

The integral control unit 176 integrates the correction amounts which are sequentially output by the adder 175 over a predetermined time, and multiplies the integral value by a predetermined integral gain. That is, the integral control unit 176 corrects the coordinate $X_{act}$ with the correction amount obtained by multiplying the amount of movement (distance) obtained by integrating the speed $V_X$ (a portion of required correction amount) output over at least a predetermined time by the predetermined integral gain. Accordingly, the current coordinate $X_{act}$ is corrected with the correction amount based on the shift amount $X_{sht}$ of the X-direction component and the coordinate $X_{act}$ corrected in the past. The predetermined time may be a time that is required when a vehicle travels a predetermined distance. Through such a process, the coordinate $X_{act}$ derived by the navigation device 50 is corrected to such a coordinate that the X-direction deviation is eliminated on the basis of the movement amount (distance) required when the host vehicle M travels for a predetermined time or a predetermined distance. In the following description, the coordinate $X_{act}$ corrected on the basis of the X-direction deviation is referred to as a coordinate $X_{act}\#$. The integral control unit 176 feeds the corrected coordinate $X_{act}\#$ back to the adder/subtractor 172.

[Position Correction Process in Y-direction]

Figure 18:
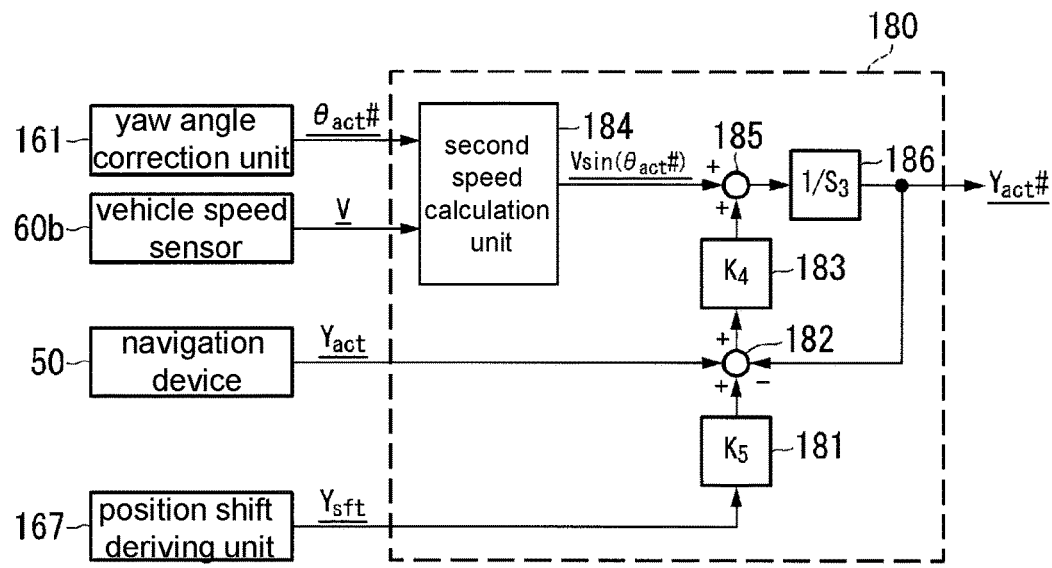
FIG. 18 illustrates an example of a configuration of a Y-direction coordinate correction unit 180.

FIG. 18 is an example of a configuration of the Y-direction coordinate correction unit 180. The Y-direction coordinate correction unit 180 includes, for example, a proportional control unit 181, an adder/subtractor 182, a proportional control unit 183, a second speed calculation unit 184, an adder 185, and an integral control unit 186.

The proportional control unit 181 multiplies the shift amount $Y_{sht}$ of the Y-direction component output by the position shift deriving unit 167 by a predetermined proportional gain $K_5$, and outputs a resultant gain-adjusted shift amount $Y_{sht}$ to the adder/subtractor 182. The proportional gain $K_5$ may be the same as different from the proportional gains $K_1$, $K_2$, or $K_3$ described above.

The adder/subtractor 182 adds the shift amount $Y_{sht}$ of the Y-direction component output by the proportional control unit 181 to the coordinate $Y_{act}$ derived by the navigation device 50 and derives a difference (hereinafter referred to as a Y-direction position deviation) obtained by subtracting the Y-direction position coordinate output by the integral control unit 186 from a resultant addition value. The adder/subtractor 182 outputs the derived Y-direction deviation to the proportional control unit 183.

The proportional control unit 183 multiplies the Y-direction deviation output by the adder/subtractor 182 by a predetermined proportional gain $K_4$, and outputs a resultant gain-adjusted Y-direction deviation to the adder 185. The proportional gain $K_4$ may be the same as or different from the proportional gains $K_1$, $K_2$, $K_3$ or $K_5$ described above.

The second speed calculation unit 184 calculates the speed $V_Y$ of the Y-direction component in the ground coordinate system $\Sigma_G$ on the basis of the corrected yaw angle $\theta_{act}\#$ output by the yaw angle correction unit 161 and the vehicle speed V detected by the vehicle speed sensor 60$b$. For example, the speed $V_Y$ is expressed by Equation (8). The second speed calculation unit 184 outputs the calculated speed $V_Y$ of the Y-direction component to the adder 185.

$$V_Y = V \sin(\theta_{act}\#) \tag{8}$$

The adder 185 adds the speed $V_Y$ of the Y-direction component output by the second speed calculation unit 184 to the Y-direction deviation output by the proportional control unit 183, and outputs a correction amount obtained by the addition to the integral control unit 186. The correction amount output by the adder 185 is another example of a "required correction amount".

The integral control unit 186 integrates the correction amounts sequentially output by the adder 185 over a predetermined time, and multiplies a resultant integral value by a predetermined integral gain. That is, the integral control unit 176 corrects the coordinate $Y_{act}$ with the correction amount obtained by multiplying a movement amount (distance) based on the speed $V_Y$ (a part of required correction amount) output for at least a predetermined time by the predetermined integral gain. Accordingly, the current coordinate $Y_{act}$ is corrected with the correction amount based on the shift amount $Y_{sht}$ of the Y-direction component and the coordinate $Y_{act}$ corrected in the past. The predetermined time may be a time that is required when a vehicle travels a predetermined distance. Through such a process, the coordinate $Y_{act}$ derived by the navigation device 50 is corrected to such a coordinate that the Y-direction deviation is eliminated on the basis of the movement amount (distance) required when the host vehicle M travels for a predetermined time or a predetermined distance. In the following description, the coordinate $Y_{act}$ corrected on the basis of the Y-direction deviation is referred to as a coordinate $Y_{act}\#$. The integral control unit 186 feeds the corrected coordinates back to the adder/subtractor 182.

The host vehicle position correction unit 160 estimates the position of the host vehicle M using an own position estimation scheme of which a representative example is odometry or the like. Odometry is a position estimation scheme that is used for control of a wheeled mobile robot or the like. Odometry obtains a moving speed from a rotational speed of wheels of the robot and integrates the speed to obtain the position and the posture.

Hereinafter, a method of estimating the position of the host vehicle M using an odometry scheme will be described. A position and a posture of the host vehicle M, for example, are modeled by Equation (9).

$$\begin{bmatrix} X_{act}\#_{k+1} \\ Y_{act}\#_{k+1} \\ \theta_{act}\#_{k+1} \end{bmatrix} = \int \left( \begin{bmatrix} V \cos(\theta_{act}\#_k) \\ V \sin(\theta_{act}\#_k) \\ \gamma \end{bmatrix} - K \begin{bmatrix} X_{act}\#_k - X_{act} \\ Y_{act}\#_k - Y_{act} \\ \theta_{act}\#_k - \theta_{act} \end{bmatrix} \right) dt \tag{9}$$

k shown in Equation (9) indicates an interval of a sampling period according to feedback control of the yaw angle correction unit 161, the X-direction coordinate correction unit 170, and the Y-direction coordinate correction unit 180. Therefore, a position ($X_{act}\#_{k+1}$, $Y_{act}\#_{k+1}$) and a posture (yaw angle $\theta_{act}\#_{k+1}$) of the host vehicle M at the current time are derived on the basis of the coordinates $X_{act}\#_k$, $Y_{act}\#_k$ and the yaw angle $\theta_{act}\#_k$ corrected one cycle before the current time, and the coordinates $X_{act}$, $Y_{act}$ and the yaw angle $\theta_{act}$ before correction one cycle before.

The parameters K shown in Equation (9) is a parameter indicating a proportional gain of each of the yaw angle correction unit 161, the X-direction coordinate correction unit 170, and the Y-direction coordinate correction unit 180. For example, the parameter is expressed by Equation (10).

$$K = [K_2 \; K_4 \; K_1]^T \tag{10}$$

The host vehicle position correction unit 160 outputs the position ($X_{act}\#_{k+1}$, $Y_{act}\#_{k+1}$) and the posture (yaw angle $\theta_{act}\#_{k+1}$) of the host vehicle M estimated on the basis of the corrected coordinates $X_{act}\#$, $Y_{act}\#$, the corrected yaw angle $\theta_{act}\#$, the coordinates $X_{act}$, $Y_{act}$ before the correction, and the yaw angle $\theta_{act}$ before the correction, for example, to the host vehicle position recognition unit 140, the action plan generation unit 144, and the trajectory generation unit 146.

Through the process of estimating the position and the posture of the host vehicle M in the host vehicle position correction unit 160 described above, the host vehicle position recognition unit 140, the action plan generation unit 144, and the trajectory generation unit 146 perform the following processes. For example, the host vehicle position recognition unit 140 may re-recognize the relative position of the host vehicle M relative to the travel lane on the basis of the estimated position $(X_{act}\#_{k+1}, Y_{act}\#_{k+1})$ of the host vehicle M rather than the position of the host vehicle M derived by the navigation device 50 (position coordinates measured by GNSS).

Further, for example, the action plan generation unit 144 may treat the estimated position $(_{act}\#_{k+1}, Y_{act}\#_{k+1})$ of the host vehicle M as the current position of the host vehicle M and reset the various events of the action plan.

Further, for example, the trajectory generation unit 146 may regenerate the trajectory with reference to the estimated position $(X_{act}\#_{k+1}, Y_{act}\#_{k°1})$ and the estimated posture (yaw angle $\theta_{act}\#_{k+1}$) of the host vehicle M. Specifically, the trajectory candidate generation unit 146B of the trajectory generation unit 146 may predict future states of surrounding vehicles such as a preceding vehicle, a following vehicle, a front reference vehicle, and a rear reference vehicle, derive a vehicle-to-vehicle distance between the estimated position of the host vehicle M and each surrounding vehicle, and re-determine a target speed such that there is no interference with the surrounding vehicles. Further, the trajectory candidate generation unit 146B of the trajectory generation unit 146 generates the trajectory with reference to the estimated position of the host vehicle M. Through these processes, the arrangement interval or the arrangement positions of the trajectory points K are appropriately changed.

Through these processes, the travel control unit 188 can more precisely control acceleration and deceleration or steering of the host vehicle M according to an actual travel state of the host vehicle M.

Further, the host vehicle position correction unit 160 may output the corrected coordinates $(X_{act}\#, Y_{act}\#)$ or the corrected yaw angle $\theta_{act}\#$ instead of the position and the posture estimated using the odometry scheme to the host vehicle position recognition unit 140, the action plan generation unit 144, the trajectory generation unit 146, and the like. In this case, since recognition accuracy of the relative position of the host vehicle M relative to the travel lane is improved, it is possible to generate a trajectory according to the actual traveling state of the host vehicle M. As a result, the travel control unit 188 can more precisely control the acceleration and deceleration or the steering of the host vehicle M.

Figure 19:
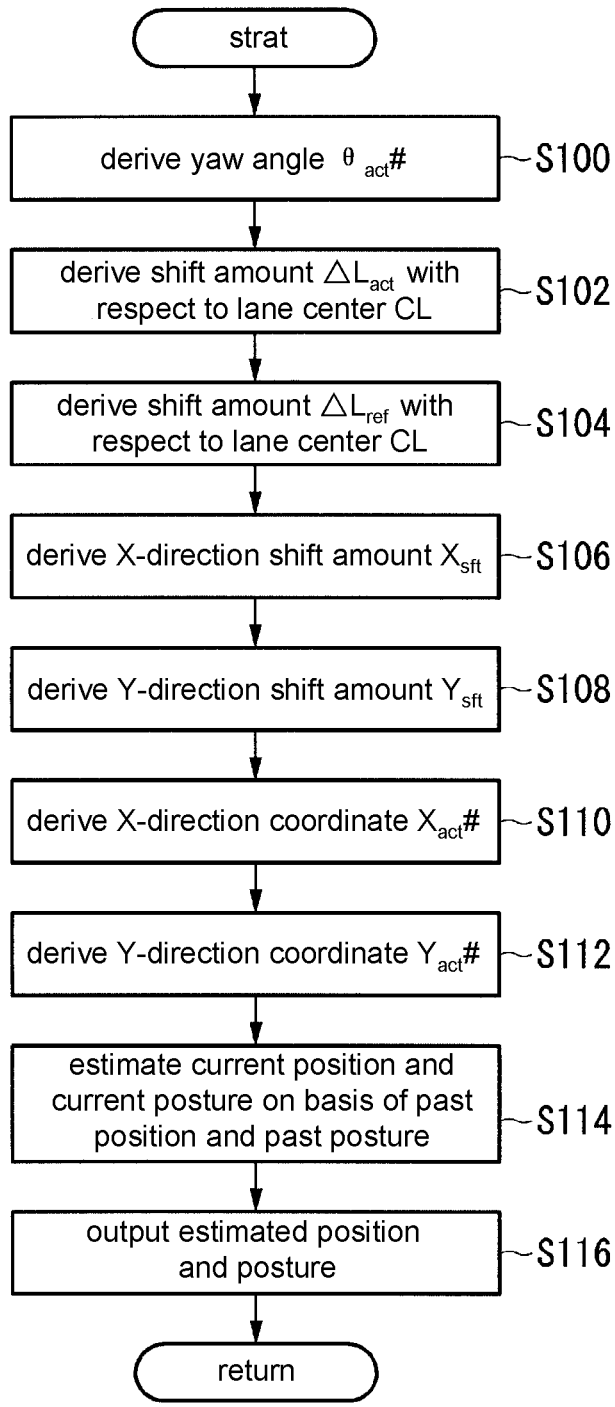
FIG. 19 is a flowchart illustrating an example of a flow of a process of the host vehicle position correction unit 160.

Hereinafter, a series of processes of the host vehicle position correction unit 160 will be described. FIG. 19 is a flowchart illustrating an example of a processing flow of the host vehicle position correction unit 160. The process of this flowchart is repeatedly performed using a predetermined sampling period. The sampling period corresponds to, for example, an integral time in each integral control unit. This period may be interlinked with a time interval that depends on the arrangement interval of the trajectory points K.

First, the yaw angle correction unit 161 derives a yaw angle $\theta_{act}\#$ obtained by correcting the yaw angle $\theta_{act}$ specified by the GNSS receiver on the basis of the angular velocity $\gamma$ detected by the yaw rate sensor 60a and the yaw angle $\theta_{act}$ specified by the GNSS receiver of the navigation device 50 (step S100).

Then, the position shift deriving unit 167 derives the shift amount $\Delta L_{act}$ of the position of the host vehicle M with respect to the lane center CL (step S102). Then, the position shift deriving unit 167 derives the shift amount $\Delta L_{ref}$ between the trajectory point K closest to the current position of the host vehicle M and the lane center CL of the target lane (step S104).

Then, the position shift deriving unit 167 derives the shift amount $X_{sht}$ of the X-direction component of the host vehicle M relative to the trajectory point $K_i$ closest to the current position of the host vehicle M on the basis of the shift amount $\Delta L_{act}$ and the shift amount $\Delta L_{ref}$ that have been derived and the corrected yaw angle $\theta_{act}\#$ derived by the yaw angle correction unit 161 (step S106) and the shift amount $Y_{sht}$ of the Y-direction component (step S108).

Then, the X-direction coordinate correction unit 170 derives the coordinate $X_{act}\#$ obtained by correcting the coordinate $X_{act}$ on the basis of the shift amount $X_{sht}$ of the X-direction component derived by the position shift deriving unit 167, the position coordinate $X_{act}$ in the X-direction of the host vehicle M derived by the GNSS receiver of the navigation device 50, and the vehicle speed V detected by the vehicle speed sensor 60b, and the yaw angle $\theta_{act}\#$ derived by the yaw angle correction unit 161 (step S110).

Then, the Y-direction coordinate correction unit 180 derives the coordinate $Y_{act}\#$ obtained by correcting the coordinate $Y_{act}$ on the basis of the shift amount $Y_{sht}$ of the Y-direction component derived by the position shift deriving unit 167, the position coordinate $Y_{act}$ in the Y-direction of the host vehicle M derived by the GNSS receiver of the navigation device 50, and the vehicle speed V detected by the vehicle speed sensor 60b, and the yaw angle $\theta_{act}\#$ derived by the yaw angle correction unit 161 (step S112).

Then, the host vehicle position correction unit 160 estimates the current position $(X_{act}\#_{k+1}, Y_{act}\#_{k+1})$ and the current posture (yaw angle $\theta_{act}\#_{k+1}$) of the host vehicle M on the basis of the corrected coordinates $X_{act}\#$ and $Y_{act}\#$ and the corrected yaw angle $\theta_{act}\#$, and the coordinates $X_{act}$ and $Y_{act}$ and the yaw angle $\theta_{act}$ before correction in the past using an odometry position estimation scheme (step S114).

Then, the host vehicle position correction unit 160 outputs the current position $(X_{act\#k+1}, Y_{act}\#_{k+1})$ and the current posture (yaw angle $\theta_{act}\#_{k+1}$ of the host vehicle M that have been estimated to, for example, the host vehicle position recognition unit 140, the action plan generation unit 144, and the trajectory generation unit 146 (step S116). Accordingly, the process of this flowchart ends.

According to the first embodiment described above, for example, since the vehicle control system 100 acquires the positional information of the host vehicle M expressed in the ground coordinate system $\Sigma_G$ from the navigation device 50 including the GNSS receiver, acquires the image obtained by imaging the road as the lane information of the road on which the host vehicle M travels, recognizes a division line of the road in the image, recognizes the relative position of the host vehicle M relative to the recognized division line, and corrects the position of the host vehicle M indicated by the position information of the host vehicle M expressed in the ground coordinate system $\Sigma_G$ on the basis of the relative position of the host vehicle M with respect to the division line, it is possible to determine the position of the vehicle more accurately.

Further, according to the first embodiment described above, the X-direction deviation and the Y-direction deviation are derived from the shift amount of the position with the term (A-B). Accordingly, even when an error is generated in any one of recognition of the position of the host vehicle M using the captured image and determination of the position of the host vehicle M by the GNSS receiver, it is possible to derive a correction amount for reducing the error.

<Second Embodiment>

Hereinafter, a second embodiment will be described. The second embodiment differs from the first embodiment in that various proportional gains K in the host vehicle position correction unit 160 are changed on the basis of a position measurement error of the position derived by the GNSS receiver of the navigation device 50. Hereinafter, the differences will be mainly described.

For example, the navigation device 50 may derive the position measurement error on the basis of a pseudo distance obtained when the position of the host vehicle M is obtained, and an accuracy reduction rate (Dilution Of Precision: DOP). The pseudo distance is, for example, a distance obtained by treating an arrival time of radio waves transmitted from an artificial satellite as a propagation time and multiplying the propagation time by a speed of light. Further, the accuracy reduction rate is an index indicating a degree of influence on position measurement accuracy due to an arrangement of the artificial satellites. The navigation device 50 outputs the derived position measurement error to the vehicle control system 100. Any configuration of the vehicle control system 100 (for example, the host vehicle position correction unit 160) may perform the derivation of the position measurement error.

Figures 20, 21:
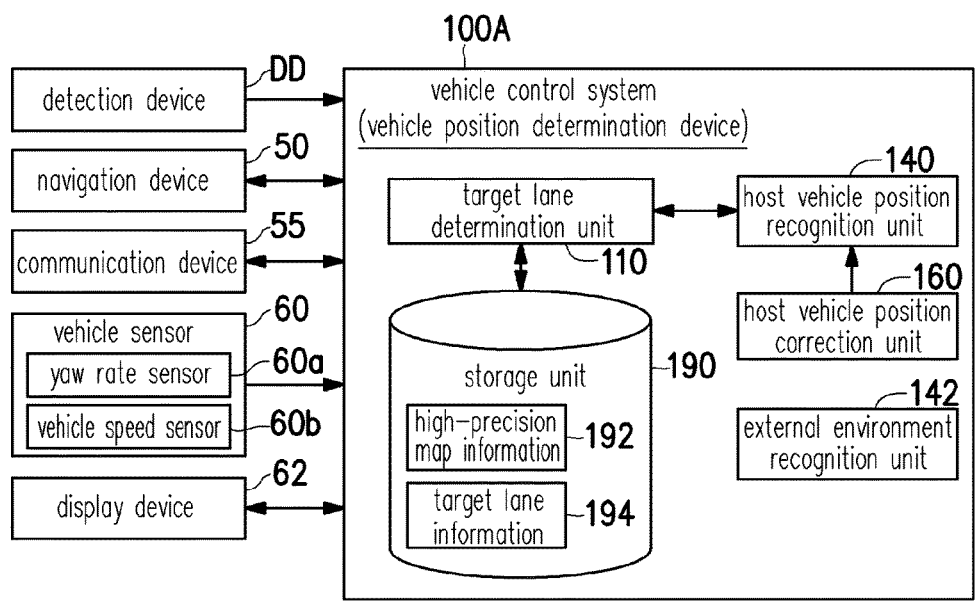
FIG. 20 is a diagram illustrating an example of a relationship between a position measurement error and various proportional gains K.
FIG. 21 is a functional configuration diagram focusing on a vehicle control system 100A according to a third embodiment.

The host vehicle position correction unit 160 changes various proportional gains K on the basis of the position measurement error derived by the navigation device 50. FIG. 20 is a diagram illustrating an example of a relationship between a position measurement error and various proportional gains K. For example, the road division line may be blurred, the road dividing line may be partially not visible due to the influence of snowfall or the like, or a vehicle may be traveling at night, and accordingly, the camera 40 may be assumed to be unable to recognize the road dividing line. In this case, recognition accuracy of the position of the lane center CL is easily degraded. Accordingly, when the position measurement error is smaller than the threshold value TH and the position measurement accuracy of the GNSS receiver is good, the host vehicle position correction unit 160 increases the proportional gains $K_1$, $K_2$, and $K_4$ and decreases the proportional gains $K_3$ and $K_5$ in order to make a degree of contribution of the position of the host vehicle M determined by the navigation device 50 greater than that of the position of the host vehicle M determined from the captured image of the camera 40. Particularly, since radio waves are generally less sensitive to the ionosphere in the atmosphere at night than in daytime, it is preferable for the proportional gains $K_1$, $K_2$, and $K_4$ to be kept high. An amount of increase and an amount of decrease of the gains may be different for each gain, or some or all of the gains may be the same. As a result, it is possible to accurately determine the position of the host vehicle M regardless of a road surface state of a road in bad weather or at night.

Meanwhile, for example, there may be cases in which a plurality of artificial satellites for position measurement are located in the same direction, a case in which the host vehicle M travels, for example, in a tunnel and is hidden in an object that shields radio waves, and a case in which an accuracy reduction rate increases, the position measurement error is equal to or higher than the threshold value TH, and the position measurement accuracy of the GNSS receiver is degraded. Further, when the host vehicle M appears from behind a shield of radio waves, the X-direction deviation or the Y-direction deviation may greatly change since the position measurement accuracy instantaneously returns to an original position measurement accuracy. Therefore, the host vehicle position correction unit 160 deceases the proportional gains $K_1$, $K_2$, and $K_4$ and increases the proportional gains $K_3$ and $K_5$ in order to make a degree of contribution of the position of the host vehicle M determined from the captured image of the camera 40 greater than that of the position of the host vehicle M determined by the navigation device 50. As a result, the host vehicle position correction unit 160 can accurately determine the position of the host vehicle M even in a situation in which the position measurement accuracy of the GNSS receiver is degraded. Further, the host vehicle position correction unit 160 can suppress an instantaneous increase in the correction amount when the position measurement accuracy of the GNSS receiver returns to an original accuracy since the proportional gains $K_1$, $K_2$, and $K_4$ are kept small. As a result, it is possible to further stabilize the behavior of the vehicle.

In the method of changing various proportional gains K described above, the host vehicle position correction unit 160 may make the proportional gains $K_3$ and $K_5$ relatively smaller or greater by maintaining current values without changing the proportional gains $K_3$ and $K_5$ when making the proportional gains $K_1$, $K_2$, and $K_4$ greater or smaller. It should be noted that this relationship can be inverted, and the proportional gains $K_1$, $K_2$, and $K_4$ may be maintained when the proportional gains $K_3$ and $K_5$ are changed.

Further, when the proportional gains $K_1$, $K_2$, and $K_4$ are changed on the basis of the position measurement error, the parameter K shown in Equation (10) described above may be similarly changed. In this case, the current position $(X_{act\#_{k+1}}, Y_{act\#_{k+1}})$ and the current posture (yaw angle $\theta_{act\#_{k+1}}$) of the host vehicle M estimated using an odometry position estimation scheme are similarly accurately derived.

According to the second embodiment described above, since one or both of the position of the host vehicle M determined by the navigation device 50 and the position of the host vehicle M determined from the captured image of the camera 40 are weighted on the basis of the position measurement error in the GNSS receiver, it is possible to determine the position of the vehicle more accurately.

<Third Embodiment>

Hereinafter, a third embodiment will be described. FIG. 21 is a functional configuration diagram focusing on a vehicle control system 100A according to the third embodiment. In the third embodiment, for example, a detection device DD, a navigation device 50, a vehicle sensor 60, a display device 62, and a vehicle control system 100A are mounted on a host vehicle M, similar to the first and second embodiments described above. The vehicle control system 100A in the third embodiment includes, for example, a target lane determination unit 110, a host vehicle position recognition unit 140, an external environment recognition unit 142, and a host vehicle position correction unit 160. The vehicle control system 100A in the third embodiment may be applied, as an application, to an existing navigation system, may be applied to a driving support device, or may be applied to an automated driving device, such as the vehicle control system 100 illustrated in the first and second embodiments. The driving support device refers to, for example, a device that performs only steering control so that a travel lane is maintained, performs only speed control to follow a preceding vehicle, or notifies a driver of a speed to be output at the time of manual driving, a lane changing timing, or the like.

The host vehicle position correction unit 160 in the third embodiment projects the position of the host vehicle M to the lane center CL that is a reference position of the target lane, and derives parameters A and B using the projected position as an alternative to a predetermined target position to correct the position coordinates ($X_{act}$, $Y_{act}$) and the yaw angle $\theta_{act}$ of the host vehicle M derived by the GNSS receiver of the navigation device 50. The host vehicle position correction unit 160, for example, displays the corrected position coordinates ($X_{act}\#$, $Y_{act}\#$) of the host vehicle M using the display device 62 to cause a vehicle occupant to be able to recognize an exact trajectory of the host vehicle M. For example, when the display device 62 is a head-up display, the vehicle occupant can perform manual driving so that a front end portion or the like of the host vehicle M is aligned along the trajectory displayed on the display device 62. As a result, it is possible to perform lane changing or the like in a timely manner.

<Fourth Embodiment>

Hereinafter, a fourth embodiment will be described. In the fourth embodiment, the vehicle control system 100 may perform, for example, vehicle-to-vehicle communication with another vehicle to acquire the position information in the ground coordinate system $\Sigma_G$ of the other vehicle, instead of acquiring the position information of the host vehicle M represented in the ground coordinate system $\Sigma_G$ from the navigation device 50. The position in the ground coordinate system $\Sigma_G$ of the other vehicle, for example, may be determined by a GNSS receiver mounted on the other vehicle. In this case, the communication device 55 in the fourth embodiment corresponds to another example of the "coordinates acquisition unit". When the position information in the ground coordinate system $\Sigma_G$ of the other vehicle is acquired, the host vehicle position correction unit 160 may convert the position of the other vehicle into the position of the host vehicle M on the basis of a vehicle-to-vehicle distance to the other vehicle and the position of the other vehicle, and use the converted position instead of the position coordinates ($X_{act}$, $Y_{act}$) of the host vehicle M to derive the corrected position coordinates ($X_{act}\#$, $Y_{act}\#$) of the host vehicle M.

Further, the host vehicle position recognition unit 140 in the fourth embodiment may recognize a road division line of the lane on which the host vehicle M travels, on the basis of detection results of the finder 20 and the radar 30. Further, the host vehicle position recognition unit 140 may acquire information on the road division line recognized by the other vehicle (for example, a preceding vehicle) through vehicle-to-vehicle communication, and treat the road division line recognized by the other vehicle as a road division line of the lane on which the host vehicle M travels.

According to the fourth embodiment described above, it is possible to determine the position of the vehicle more accurately, similar to the first to third embodiments described above.

Modes for carrying out the present invention have been described with reference to the embodiments, but the present invention is not limited to the embodiments, and various modifications and substitutions can be added within a range not departing from the gist of the present invention.

What is claimed is:

1. A vehicle position determination device, comprising:
a hardware processor configured to control:
a coordinates acquisition unit that acquires a position of a vehicle determined in a geographic coordinate system on the basis of information acquired from radio waves coming from a satellite;
a recognition unit that acquires lane information of a road on which the vehicle travels and recognizes the position of the vehicle on the lane; and
a control unit that derives a required correction amount on the basis of a comparison of the position acquired by the coordinates acquisition unit with the position recognized by the recognition unit, and corrects the position acquired by the coordinates acquisition unit on the basis of the derived required correction amount, and determines the position of the vehicle in the geographic coordinate system,
wherein the control unit weights one or both of the position acquired by the coordinates acquisition unit and the position recognized by the recognition unit to derive the required correction amount on the basis of accuracy according to determination of the position acquired by the coordinates acquisition unit,
wherein when the accuracy is lower than a threshold value, the control unit causes a weight of the position acquired by the coordinates acquisition unit to be greater than a weight of the position recognized by the recognition unit,
wherein when the accuracy is equal to or higher than a threshold value, the control unit causes a weight of the position acquired by the coordinates acquisition unit to be smaller than a weight of the position recognized by the recognition unit, and
wherein the weight of the position recognized by the recognition unit is changed by an amount corresponding to the change in the weight of the position acquired by the coordinate acquisition unit.

2. The vehicle position determination device according to claim 1,
wherein the recognition unit recognizes a division line of a road included in an image obtained by imaging the road on which the vehicle travels, and recognizes a relative position of the vehicle relative to the recognized division line,
the control unit
derives a first deviation between a reference position of the road of which the division line is recognized by the recognition unit and the position acquired by the coordinates acquisition unit, and a second deviation between the reference position and the position recognized by the recognition unit, and
derives the required correction amount on the basis of a difference between the first deviation and the second deviation that are derived.

3. The vehicle position determination device according to claim 2,
wherein the reference position is a lane center,
the first deviation is a distance from a lane center of the road of which the division line is recognized by the recognition unit to the position acquired by the coordinates acquisition unit, and
the second deviation is a distance from the lane center of the road of which the division line is recognized by the recognition unit to the position recognized by the recognition unit.

4. The vehicle position determination device according to claim 3,
wherein the control unit weights one or both of the position acquired by the coordinates acquisition unit and the position recognized by the recognition unit to derive the required correction amount on the basis of accuracy according to determination of the position acquired by the coordinates acquisition unit.

5. The vehicle position determination device according to claim 2,
wherein the control unit weights one or both of the position acquired by the coordinates acquisition unit and the position recognized by the recognition unit to derive the required correction amount on the basis of accuracy according to determination of the position acquired by the coordinates acquisition unit.

6. The vehicle position determination device according to claim 1, further comprising:
a trajectory generation unit that generates a trajectory including a plurality of future target positions to be reached by the vehicle, the target positions being continuous in time series in a traveling direction of the vehicle from the position acquired by the coordinates acquisition unit,
wherein the control unit
derives a first deviation between a predetermined target position among the target positions included in the trajectory generated by the trajectory generation unit and the position acquired by the coordinates acquisition unit, and a second deviation between the predetermined target position and the position recognized by the recognition unit, and
derives the required correction amount on the basis of a difference between the first deviation and the second deviation.

7. The vehicle position determination device according to claim 6,
wherein the first deviation is a distance that is a sum of a distance from the lane center of the road of which the division line is recognized by the recognition unit to the predetermined target position and a distance from the lane center of the road of which the division line is recognized by the recognition unit to the position acquired by the coordinates acquisition unit, and
the second deviation is a distance from the predetermined target position to the position recognized by the recognition unit.

8. The vehicle position determination device according to claim 7,
wherein the control unit weights one or both of the position acquired by the coordinates acquisition unit and the position recognized by the recognition unit to derive the required correction amount on the basis of accuracy according to determination of the position acquired by the coordinates acquisition unit.

9. The vehicle position determination device according to claim 6,
wherein the control unit weights one or both of the position acquired by the coordinates acquisition unit and the position recognized by the recognition unit to derive the required correction amount on the basis of accuracy according to determination of the position acquired by the coordinates acquisition unit.

10. The vehicle position determination device according to claim 1,
wherein the control unit derives a movement amount required when the vehicle travels for a predetermined time or a predetermined distance from the position acquired by the coordinates acquisition unit, as the required correction amount.

11. The vehicle position determination device according to claim 10,
wherein the control unit repeatedly executes deriving a movement amount required when the vehicle travels for a predetermined time or a predetermined distance from the corrected position, as a required correction amount, and then further correcting the corrected position with the derived movement amount.

12. The vehicle position determination device according to claim 10,
wherein the movement amount includes some or all of a movement amount in a traveling direction of the vehicle, a movement amount in a vehicle width direction of the vehicle, and a rotational movement amount in a yaw angle direction of the vehicle.

13. The vehicle position determination device according to claim 10,
wherein the control unit weights one or both of the position acquired by the coordinates acquisition unit and the position recognized by the recognition unit to derive the required correction amount on the basis of accuracy according to determination of the position acquired by the coordinates acquisition unit.

14. A vehicle control system, comprising:
a hardware processor configured to control:
a coordinates acquisition unit that acquires a position of a vehicle in a geographic coordinate system;
a recognition unit that acquires lane information of a road on which the vehicle travels and recognizes the position of the vehicle on the lane;
a trajectory generation unit that generates a trajectory including a plurality of future target positions to be reached by the vehicle, the target positions being continuous in time series in a traveling direction of the vehicle from the position acquired by the coordinates acquisition unit,
an automated drive control unit that automatically performs at least one of speed control and steering control of the vehicle on the basis of the trajectory generated by the trajectory generation unit; and
a control unit that derives a required correction amount of the position acquired by the coordinates acquisition unit on the basis of one or both of the position recognized by the recognition unit and a target position included in the trajectory generated by the trajectory generation unit, and determines the position of the vehicle in the geographic coordinate system,
wherein the control unit weights one or both of the position acquired by the coordinates acquisition unit and the position recognized by the recognition unit to derive the required correction amount on the basis of accuracy according to determination of the position acquired by the coordinates acquisition unit,
wherein when the accuracy is lower than a threshold value, the control unit causes a weight of the position acquired by the coordinates acquisition unit to be greater than a weight of the position recognized by the recognition unit,
wherein when the accuracy is equal to or higher than a threshold value, the control unit causes a weight of the position acquired by the coordinates acquisition unit to be smaller than a weight of the position recognized by the recognition unit, and
wherein the weight of the position recognized by the recognition unit is changed by an amount corresponding to the change in the weight of the position acquired by the coordinate acquisition unit.

15. A vehicle position determination method,
wherein a vehicle-mounted computer
acquires a position of a vehicle in a geographic coordinate system,
acquires lane information of a road on which the vehicle travels,
recognizes the position of the vehicle on the lane,
derives a required correction amount on the basis of a comparison of the position acquired unit with the position recognized, and corrects the position acquired on the basis of the derived required correction amount to determine the position of the vehicle in the geographic coordinate system,
weights one or both of the position acquired and the position recognized to derive the required correction amount on the basis of accuracy according to determination of the position acquired,
when the accuracy is lower than a threshold value, causes a weight of the position acquired to be greater than a weight of the position recognized,
when the accuracy is equal to or higher than a threshold value, causes a weight of the position acquired to be smaller than a weight of the position recognized, and
the weight of the position recognized is changed by an amount corresponding to the change in the weight of the position acquired.

16. A vehicle position determination program product comprising a non-transitory computer usable medium having control logic stored therein for causing a vehicle-mounted computer to:
acquire a position of a vehicle in a geographic coordinate system,
acquire lane information of a road on which the vehicle travels,
recognize the position of the vehicle on the lane,
derives a required correction amount on the basis of a comparison of the position acquired unit with the position recognized, and corrects the position acquired on the basis of the derived required correction amount to determine the position of the vehicle in the geographic coordinate system,
weights one or both of the position acquired and the position recognized to derive the required correction amount on the basis of accuracy according to determination of the position acquired,
when the accuracy is lower than a threshold value, causes a weight of the position acquired to be greater than a weight of the position recognized,
when the accuracy is equal to or higher than a threshold value, causes a weight of the position acquired to be smaller than a weight of the position recognized, and
the weight of the position recognized is changed by an amount corresponding to the change in the weight of the position acquired.

* * * * *